United States Patent
Talavasek et al.

(10) Patent No.: US 12,043,344 B2
(45) Date of Patent: Jul. 23, 2024

(54) BICYCLE WITH BATTERY, MOTOR AND MOTOR MOUNT, WIRE ROUTING, SPEED SENSOR, AND DROPPER SEAT POST

(71) Applicant: Specialized Bicycle Components, Inc., Morgan Hill, CA (US)

(72) Inventors: Jan Talavasek, Knonau (CH); Vincent Patureau, Zurich (CH); Marc Pallure, Zug (CH); Marco Werner Sonderegger, Benzenschwil (CH)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 18/307,541

(22) Filed: Apr. 26, 2023

(65) Prior Publication Data

US 2024/0158042 A1    May 16, 2024

Related U.S. Application Data

(63) Continuation of application No. 17/269,597, filed as application No. PCT/US2019/047435 on Aug. 21, (Continued)

(51) Int. Cl.
*B62K 3/02* (2006.01)
*B62J 11/19* (2020.01)
(Continued)

(52) U.S. Cl.
CPC .......... *B62M 6/90* (2013.01); *B62K 3/02* (2013.01); *B62M 6/40* (2013.01); *B62M 6/55* (2013.01); *B62J 11/19* (2020.02)

(58) Field of Classification Search
CPC ... B62M 6/90; B62M 6/40; B62M 6/55; B62J 11/19
See application file for complete search history.

(56) References Cited

U.S. PATENT DOCUMENTS

| | | |
|---|---|---|
| 4,565,383 A | 1/1986 | Isaac |
| 4,915,404 A | 4/1990 | Chonan |

(Continued)

FOREIGN PATENT DOCUMENTS

| | | | |
|---|---|---|---|
| CN | 2323355 Y | * | 6/1999 |
| CN | 204587213 U | | 8/2015 |

(Continued)

OTHER PUBLICATIONS

European Office Action for Application No. 19851471.3 dated Oct. 6, 2023 (5 pages).

(Continued)

*Primary Examiner* — Jacob D Knutson

(74) *Attorney, Agent, or Firm* — Michael Best & Friedrich LLP

(57) ABSTRACT

An ebike comprises a front wheel, a rear wheel, a frame structure supported on the front wheel and the rear wheel, a crank assembly, and a battery assembly. The frame structure can include a front fork supported on the front wheel, a head tube coupled to the front fork, and a down tube extending downward and rearward from the head tube, the down tube defining a down tube axis and being open at its lower end. The crank assembly can be supported by the frame structure and can be rotatable about a crank axis that is spaced rearward from the down tube axis. The battery assembly can be at least partially secured in the down tube in an installed position and can be slidable into the down tube from the lower end of the down tube along the down tube axis.

20 Claims, 23 Drawing Sheets

Related U.S. Application Data 2019, now Pat. No. 11,667,348, which is a continuation of application No. 16/107,693, filed on Aug. 21, 2018, now Pat. No. 10,906,610, and a continuation of application No. 16/107,701, filed on Aug. 21, 2018, now Pat. No. 11,046,389, and a continuation of application No. 16/107,710, filed on Aug. 21, 2018, now Pat. No. 10,906,609, and a continuation of application No. 16/107,715, filed on Aug. 21, 2018, now Pat. No. 11,124,259.

(60) Provisional application No. 62/720,729, filed on Aug. 21, 2018.

(51) Int. Cl.
  *B62M 6/40* (2010.01)
  *B62M 6/55* (2010.01)
  *B62M 6/90* (2010.01)

(56) References Cited

U.S. PATENT DOCUMENTS

| | | | |
|---|---|---|---|
| 5,197,927 A | 3/1993 | Patterson et al. | |
| 5,570,752 A | 11/1996 | Takata | |
| 6,505,846 B1 | 1/2003 | Hoffman | |
| 6,945,081 B1 | 9/2005 | Lopes | |
| 7,566,065 B2 | 7/2009 | Fukui | |
| 7,854,442 B2 | 12/2010 | Onogi et al. | |
| 7,909,348 B2 | 3/2011 | Klieber | |
| 8,079,772 B1 | 12/2011 | Brennan et al. | |
| 8,469,381 B2 | 6/2013 | Dodman et al. | |
| 8,662,519 B2 | 3/2014 | Domahidy | |
| 8,789,840 B2 | 7/2014 | Priest et al. | |
| 8,960,702 B2 | 2/2015 | Vollmer et al. | |
| 9,403,568 B2 | 8/2016 | Tseng | |
| 9,422,018 B2 | 8/2016 | Pelot et al. | |
| 9,446,812 B2 | 9/2016 | Nago | |
| 9,511,810 B2 | 12/2016 | Alan | |
| 9,561,836 B2 | 2/2017 | Thompson | |
| 9,580,141 B2 | 2/2017 | Talavasek et al. | |
| 9,676,443 B2 | 6/2017 | Perkins et al. | |
| 9,783,252 B2 | 10/2017 | Kim | |
| 11,124,259 B2 | 9/2021 | Talavasek et al. | |
| 2005/0046142 A1 | 3/2005 | Chamberlain | |
| 2006/0145446 A1 | 7/2006 | Schmider | |
| 2010/0207351 A1 | 8/2010 | Klieber | |
| 2012/0049483 A1 | 3/2012 | Dodman et al. | |
| 2012/0175471 A1 | 7/2012 | Lanz | |
| 2013/0241169 A1 | 9/2013 | Talavasek et al. | |
| 2013/0241174 A1 | 9/2013 | Meyer et al. | |
| 2014/0116190 A1 | 5/2014 | Sugii et al. | |
| 2016/0056432 A1 | 2/2016 | Searles | |
| 2016/0059919 A1 | 3/2016 | Kim | |
| 2016/0339978 A1 | 11/2016 | Braucht et al. | |
| 2016/0375956 A1* | 12/2016 | Talavasek | B62K 11/04 180/220 |
| 2017/0001677 A1 | 1/2017 | Adomeit | |
| 2018/0001785 A1 | 1/2018 | Shimoda et al. | |
| 2018/0009494 A1 | 1/2018 | Schlanger | |
| 2018/0017152 A1* | 1/2018 | Emura | B62K 25/30 |
| 2018/0072379 A1* | 3/2018 | Talavasek | B62J 43/13 |
| 2018/0251188 A1 | 9/2018 | Durdevic et al. | |
| 2018/0269439 A1 | 9/2018 | Yoneda et al. | |

FOREIGN PATENT DOCUMENTS

| | | | |
|---|---|---|---|
| DE | 102014005527 A1 * | 10/2015 | ............ B60T 8/1706 |
| DE | 102016205539 B3 | 9/2017 | |
| EP | 3239029 A1 * | 11/2017 | ............ B62K 11/04 |
| EP | 3239029 A1 | 11/2017 | |

OTHER PUBLICATIONS

International Search Report and Written Opinion for Application No. PCT/US 19/47435 dated Dec. 31, 2019 (15 pages).
Elektrofahrrad24, "Haibike Flyon Modelle 2019 / Eurobike 2018," <https://www.youtube.com/watch?v=JwyiVYsLMeg> YouTube Video, Jul. 20, 2018.
European Patent Office Extended Search Report and Written Opinion for Application No. 19851471.3 dated Aug. 10, 2021 (8 pages).

* cited by examiner

BICYCLE WITH BATTERY, MOTOR AND MOTOR MOUNT, WIRE ROUTING, SPEED SENSOR, AND DROPPER SEAT POST

CROSS-REFERENCE TO RELATED APPLICATIONS

This application is a continuation of U.S. patent application Ser. No. 17/269,597, filed Feb. 19, 2021, which is a 371 of PCT/US19/47435, filed Aug. 21, 2019. PCT/US19/47435 claims priority to U.S. patent application Ser. No. 16/107,710, filed Aug. 21, 2018, to U.S. patent application Ser. No. 16/107,693, filed Aug. 21, 2018, to U.S. patent application Ser. No. 16/107,701, filed Aug. 21, 2018, to U.S. patent application Ser. No. 16/107,706, filed Aug. 21, 2018, to U.S. patent application Ser. No. 16/107,715, filed Aug. 21, 2018, and to U.S. Provisional Patent Application No. 62/720,729, filed Aug. 21, 2018. The entire contents of each of U.S. patent application Ser. No. 17/269,597, PCT/US19/47435, U.S. patent application Ser. No. 16/107,710, U.S. patent application Ser. No. 16/107,693, U.S. patent application Ser. No. 16/107,701, U.S. patent application Ser. No. 16/107,706, U.S. patent application Ser. No. 16/107,715, and U.S. Provisional Patent Application No. 62/720,729 are incorporated herein by reference.

BACKGROUND

The present invention relates to bicycles, including bicycles having electric motors, or "ebikes," and more particularly to batteries, electric motors (and their mounts), wire routing, speed sensors, and dropper seat posts for bicycles.

Ebikes have an electric motor and a battery for powering the electric motor. Ebike batteries may be secured to the ebike in some fashion, such as to the bike frame or a rack attached to the frame. Also, ebike batteries may be housed within a hollow chamber of the ebike frame. The ebike motors may also be secured to the ebike in some fashion, such as to the bike frame, or may be housed within a hollow chamber of the ebike frame. Ebikes also have cables and wires that facilitate operation of the bicycle, including providing power and communication between the battery, motor, and controller. Such cables and wires may be housed within a hollow chamber of the ebike frame.

Certain classes of ebikes are limited to the situations in which power from the motor can be used to propel the ebike. For example, some ebikes are limited to a maximum speed during which motor power can be used to propel the ebike. In order to determine speed, ebikes may include a speed sensor that measures rotation of the ebike wheels. For example, an inductive sensor may be attached to the ebike frame, and one of the wheels may be provided with a magnet that rotates with the wheel. As the magnet rotates with the wheel, the sensor detects the magnet passing by and counts the number of revolutions of the wheel. Using the sensor's count and a known wheel circumference, an ebike controller can determine the speed of the ebike.

Bicycles, such as ebikes, also typically include front and rear wheels, a frame supported on the wheels, handlebars for steering the bicycle, and a seat for the rider to sit on while riding. The seat is usually supported on the frame by a seat post. One type of seat post is called a dropper seat post that can be adjusted in length so that the height of the seat relative to the frame can be changed while riding. For example, the dropper seat post can have two telescoping tubes that are slidable relative to each other between raised and lowered positions. A locking mechanism can be used to secure the dropper seat post in the desired position. In order to adjust the length of the dropper seat post, the locking mechanism is released, the length is adjusted, and the locking mechanism is then re-engaged.

In order to facilitate release of the locking mechanism while riding, bicycles can be provided with a remote actuator, such as an actuation lever on the handlebar that actuates a transmission device (e.g., a mechanical cable, hydraulic fluid, or an electrical wire). The transmission device is typically housed within a control housing that routes the transmission device from the remote actuator to the locking mechanism.

DETAILED DESCRIPTION

Figure 1:
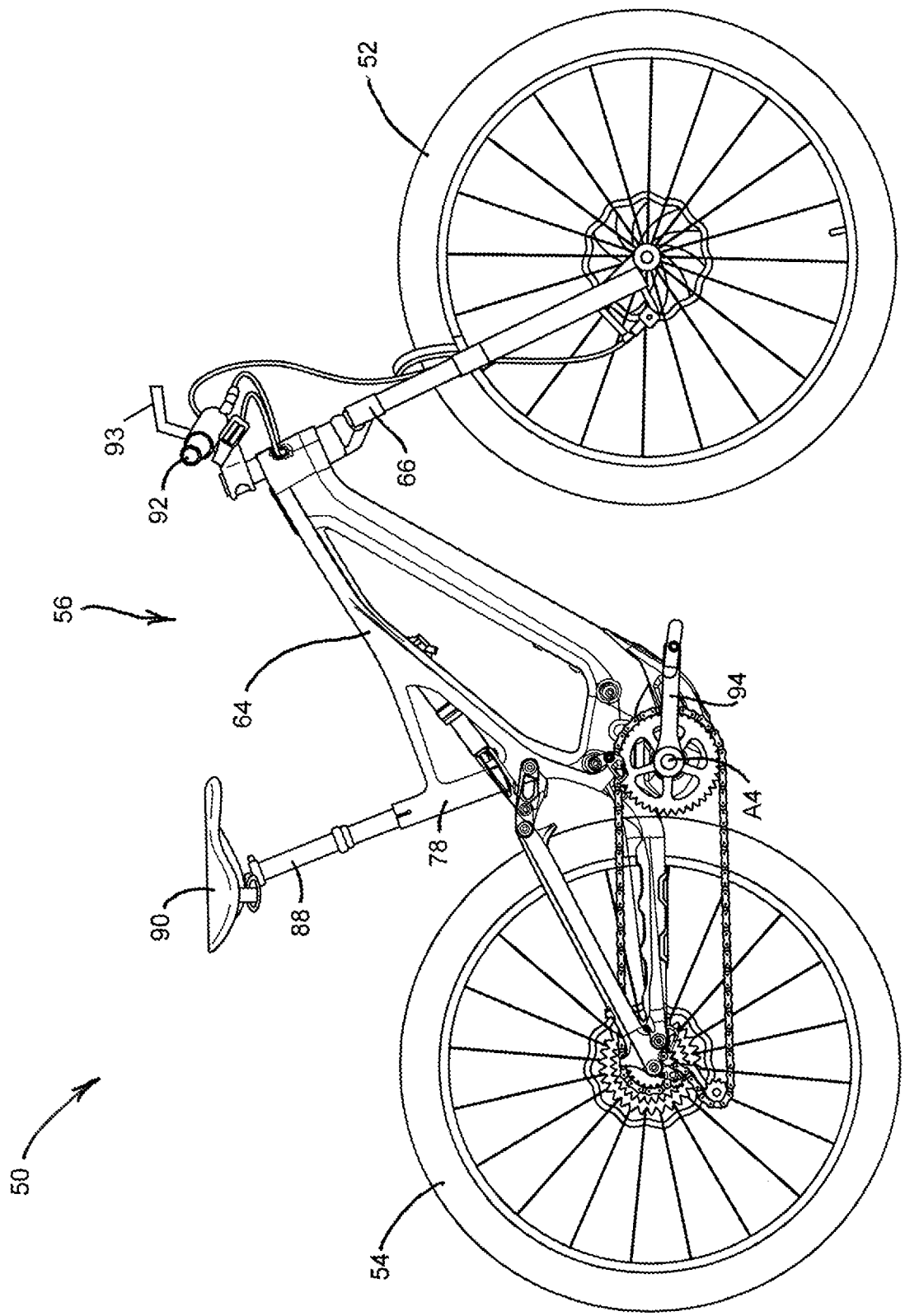
FIG. 1 is a right side view of an ebike including a frame assembly, according to an embodiment.
Figure 2:
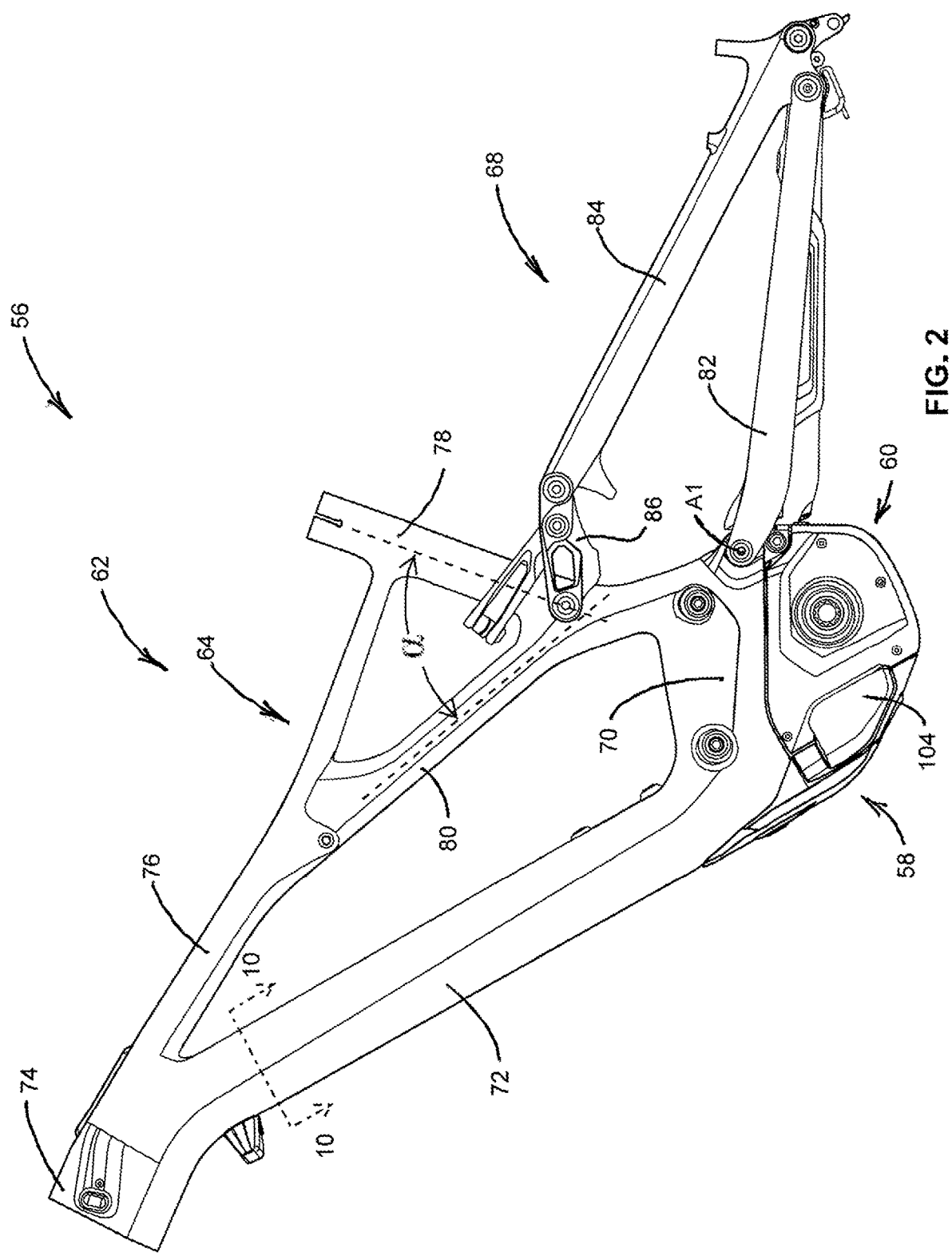
FIG. 2 is left side view of the frame assembly of the ebike in FIG. 1, the frame assembly having a frame structure, a motor assembly, and a battery assembly.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

According to an exemplary embodiment, an ebike comprises a front wheel, a rear wheel, and a frame structure supported on the front wheel and the rear wheel. The frame structure includes a main frame and further includes a rear frame pivotally coupled to the main frame at a lower pivot axis defining a horizontal plane. The main frame includes a head tube, a down tube, a seat tube, and a bottom shell coupling the down tube to the seat tube, the bottom shell including sidewalls at least partially defining a hollow interior. The ebike further comprises a motor assembly having an upper motor portion positioned in the hollow interior of the bottom shell and a lower motor portion hanging below the bottom shell. The motor assembly is secured to the bottom shell by a lower fastener below the horizontal plane and an upper fastener above the horizontal plane. The bottom shell includes a downwardly facing opening at least partially defined by lower edges of the sidewalls.

The ebike may further comprise a battery assembly at least partially positioned in the hollow interior of the bottom shell, the battery assembly including a lower battery portion hanging below the bottom shell. For example, the battery assembly may be slidable from the bottom shell along a battery axis that is parallel to a down tube axis when the motor assembly is secured to the bottom shell. The lower motor portion and the lower battery portion are positioned lower than the main frame and are also positioned lower than the rear frame. Also, each one of the battery assembly and the motor assembly may be able to be removed from the main frame without another one of the battery assembly and motor assembly being removed from the main frame. The ebike may further comprise a motor cover enclosing the lower motor portion.

According to another exemplary embodiment, an ebike comprises a front wheel, a rear wheel, a frame structure supported on the front wheel and the rear wheel, a motor assembly, and a battery assembly. The frame structure includes a main frame having a head tube, a down tube, a seat tube, and a bottom shell coupling the down tube to the seat tube. The bottom shell including sidewalls at least partially defining a hollow interior. The motor assembly has an upper motor portion positioned in the hollow interior of the bottom shell and a lower motor portion hanging below the bottom shell, and the battery assembly is at least partially positioned in the hollow interior of the bottom shell, and the battery assembly includes a lower battery portion hanging below the bottom shell.

According to an exemplary embodiment, an ebike comprises a front wheel, a rear wheel, a frame structure supported on the front wheel and the rear wheel, a crank assembly, and a battery assembly. The frame structure can include a front fork supported on the front wheel, a head tube coupled to the front fork, and a down tube extending downward and rearward from the head tube, the down tube defining a lower end and a down tube axis, and being open at the lower end. The crank assembly can be supported by the frame structure and can be rotatable about a crank axis that is spaced rearward from the down tube axis. The battery assembly can be at least partially secured in the down tube in an installed position and can be slidable into the down tube from the lower end of the down tube along the down tube axis.

The battery assembly can include a lower end that protrudes from the lower end of the down tube when in the installed position. The battery assembly can include a battery housing protruding from the lower end of the down tube when in the installed position, and a battery cover secured to a lower end of the battery housing and substantially enclosing the lower end of the battery housing when the battery assembly is in the installed position. At least a portion of the battery housing can extend below a horizontal plane defined by the crank axis. In addition, the battery housing can protrude from the lower end of the down tube by a distance that is at least 10 percent (%) of a length of the battery housing.

The battery cover can comprise an energy-absorbing zone that protects the battery housing. For example, the energy-absorbing zone can comprise a honeycomb cell structure. The battery cover further can comprise a skid plate spaced from the battery housing by a gap, and the lower end of the down tube can be positioned at least partially in the gap. In one embodiment, the skid plate can comprise a plate hole, the down tube can comprise a tube hole, and the battery housing can comprise a threaded hole, and the battery assembly further can comprise a threaded fastener positioned through the plate hole and tube hole and threaded into the threaded hole to secure the lower end of the battery assembly to the down tube.

The battery cover further can comprise a recess that facilitates engagement of a finger of a user to remove the battery assembly from the down tube. For example, the recess can be defined at least partially by a recess wall that is substantially perpendicular to the down tube axis.

According to an exemplary embodiment, an ebike comprises a front wheel, a rear wheel, a frame structure supported on the front wheel and the rear wheel, the frame structure including a hollow tube having a converging inner surface, and a battery assembly configured to be coupled to the frame structure in an installed position at least partially in the hollow tube. The converging inner surface is configured such that at least a portion of the battery assembly is supported within the hollow tube by the converging inner surface when the battery assembly is at least partially positioned in the hollow tube. The hollow tube includes an end, and the end of the hollow tube includes an opening adapted to receive the battery assembly and permit the battery assembly to be inserted into the hollow tube, and wherein the converging inner surface converges away from the opening.

In one embodiment, the frame structure includes a front fork supported on the front wheel, and a head tube coupled to the front fork, wherein the hollow tube comprises a down tube extending downward and rearward from the head tube. A lower end of the down tube may comprise an opening, and a lower end of the battery assembly may protrude from the lower end of the down tube when the battery assembly is in the installed position.

In another embodiment, the battery assembly comprises a battery housing and a resilient lateral support (e.g., two leaf spring flexures in opposing relation to each other), wherein the resilient lateral support resiliently laterally supports a portion of the battery housing in the hollow tube when the battery assembly is positioned in the hollow tube. For example, the battery assembly may define a battery width across the resilient lateral support in an unstressed condition, and the converging inner surface may define an inner width at a location of the resilient lateral support when the battery assembly is in the installed position, and the battery width may be larger than the inner width such that the resilient lateral support is compressed laterally when the battery assembly is in the installed position.

According to an exemplary embodiment, an ebike comprises a front wheel, a rear wheel, a frame structure supported on the front wheel and the rear wheel, a motor assembly coupled to the frame structure, and a battery assembly configured to be coupled to the frame structure. The frame structure includes a front fork coupled to the front wheel, a head tube coupled to the front fork, a down tube extending downward and rearward from the head tube, a top tube extending rearward from the head tube, a seat tube coupling a rear end of the top tube to a rear end of the down tube, and a diagonal tube coupling the top tube with the seat tube. The battery assembly is configured to be at least partially positioned in the frame structure (e.g., the down tube). The ebike further includes a user interface configured to be supported by the frame structure, and further includes an electrical cable coupling the user interface with the motor assembly, the electrical cable being positioned at least partially in the diagonal tube. The rear wheel defines a center plane, and the diagonal tube comprises a side tube offset from the center plane. In addition, an interior of the down tube may be free of electrical cables.

In one embodiment, the down tube defines a down tube axis and includes a lower end having an opening, and the battery assembly is configured to be at least partially secured in the down tube in an installed position and is configured to be slidable from the lower end of the down tube through the opening along the down tube axis. The battery assembly includes a lower end that protrudes from the lower end of the down tube when the batter assembly is in the installed position. In addition, a crank assembly may be supported by the frame structure and may be rotatable about a crank axis that is spaced rearward from the down tube axis. If desired, a lower battery portion of the battery assembly may extend below a horizontal plane defined by the crank axis. In one particular embodiment, the frame structure further includes a bottom shell coupling the down tube to the seat tube, and the bottom shell includes sidewalls at least partially defining a hollow interior. In this embodiment, the motor assembly can include an upper motor portion positioned in the bottom shell and a lower motor portion hanging below the bottom shell. The lower motor portion and the lower battery portion are positioned lower than the frame structure.

According to an exemplary embodiment, a bicycle comprises a front wheel, a rear wheel, a frame structure supported on the front wheel and the rear wheel. The frame structure includes a hollow seat tube. The bicycle further comprises a dropper seat post supported by the hollow seat tube, a loop stay positioned in the frame structure below the dropper seat post, and a control housing positioned in the frame structure. The control housing is coupled to the dropper seat post and is configured to actuate the dropper seat post. The control housing includes a lower loop wrapped around at least a portion of the loop stay. The bicycle may further comprise a motor assembly coupled to the frame structure by a motor fastener, wherein the loop stay is coupled to the frame structure by the motor fastener.

The frame structure may further include a top tube and a diagonal tube coupling the top tube with the hollow seat tube, and the control housing may be at least partially positioned in the diagonal tube. For example, the diagonal tube may comprise a side tube offset from the center plane. In one embodiment, the diagonal tube intersects and forms an acute upper angle with the hollow seat tube at an intersection. The lower loop is positioned below the intersection and the dropper seat post is positioned above the intersection. The lower loop may be at least partially positioned in a portion of the frame structure having a lower inner width, and the dropper seat post may be positioned in an upper portion of the hollow seat tube having an upper inner width that is smaller than the lower inner width.

In one particular embodiment, the frame structure further includes a front fork coupled to the front wheel, a head tube coupled to the front fork, and a down tube extending downward and rearward from the head tube. The bicycle further includes a battery assembly positioned at least partially in the down tube. For example, the down tube may define a down tube axis and include a lower end with an opening, and the battery assembly may be secured at least partially in the down tube in an installed position and is slidable through the opening in the lower end of the down tube along the down tube axis.

According to an exemplary embodiment, an ebike comprises a front wheel, a rear wheel, a frame structure supported on the front wheel and the rear wheel, a motor controller coupled to the frame structure, and a speed sensor assembly coupled to the frame structure for sensing rotational speed of at least one of the front wheel or the rear wheel. The speed sensor assembly includes a sensor unit coupled to the frame structure adjacent to the at least one of the front wheel or the rear wheel. The sensor unit has two ends, a length between the two ends, and a maximum sensor width measured perpendicular to the length. The ebike further comprises a sensor wire secured to an end of the two ends of the sensor unit and coupling the sensor unit to the motor controller. The sensor wire includes an outer housing having a housing width that is at least 25% of the maximum sensor width (e.g., at least 30%, 40%, or 50% of the maximum sensor width). The sensor unit can be free of an integral mounting structure.

The ebike can further comprise a sensor mount secured to the frame structure (e.g., a chainstay), wherein the sensor unit is sandwiched between the sensor mount and the frame structure. The sensor mount can include a first recess shaped to receive the sensor unit and a second recess shaped to receive the sensor wire. The second recess can be shaped to receive the sensor wire in a first configuration, and the sensor mount can further include a third recess adapted to receive the sensor wire in a second configuration different than the first configuration.

Clause 1: Some embodiments include an ebike. The ebike can comprise a front wheel, a rear wheel, and a frame structure supported on the front wheel and the rear wheel. The frame structure can comprise a front fork supported on the front wheel, a head tube coupled to the front fork, and a down tube extending downward and rearward from the head tube. The down tube can define a lower end and a down tube axis, and can be open at the lower end. The ebike can further comprise a crank assembly supported by the frame structure. The crank assembly can be rotatable about a crank axis that is spaced rearward from the down tube axis. The ebike can further comprise a battery assembly at least partially secured in the down tube in an installed position and slidable into the down tube from the lower end of the down tube along the down tube axis.

Clause 2: In these or other embodiments, the battery assembly can comprise a lower end that protrudes from the lower end of the down tube when in the installed position.

Clause 3: In these or other embodiments, the battery can comprise a battery housing protruding from the lower end of the down tube when in the installed position and can include a lower end of the battery housing. The battery can further comprise a battery cover secured to the lower end of the battery housing and substantially enclosing the lower end of the battery housing when the battery assembly is in the installed position.

Clause 4: In these or other embodiments, at least a portion of the battery housing can extend below a horizontal plane defined by the crank axis.

Clause 5: In these or other embodiments, the battery housing can comprise a housing length, and the battery housing can protrude from the lower end of the down tube by a distance that is at least 10% of the housing length.

Clause 6: In these or other embodiments, the battery cover can comprise an energy-absorbing zone that protects the battery housing.

Clause 7: In these or other embodiments, the energy-absorbing zone can comprise a honeycomb cell structure.

Clause 8: In these or other embodiments, the battery cover can comprise a skid plate spaced from the battery housing by a gap, and the lower end of the down tube can be at least partially positioned in the gap.

Clause 9: In these or other embodiments, the skid plate can comprise a plate hole, the down tube can comprise a tube hole, and the battery housing can comprise a threaded hole. The battery assembly can further comprise a threaded fastener positioned through the plate hole and the tube hole and threaded into the threaded hole to secure the lower end of the battery assembly to the down tube.

Clause 10: In these or other embodiments, the battery cover can comprise a recess that facilitates engagement of a finger of a user to remove the battery assembly from the down tube.

Clause 11: In these or other embodiments, the recess can be at least partially defined by a recess wall that is substantially perpendicular to the down tube axis.

Clause 12: Some embodiments include an ebike frame assembly. The ebike frame assembly can comprise a frame structure adapted to be supported on a front wheel and a rear wheel, the frame structure including a front fork, a head tube coupled to the front fork, and a down tube extending downward and rearward from the head tube, the down tube defining a lower end and a down tube axis, and being open at the lower end. The ebike frame assembly can further comprise a crank assembly supported by the frame structure, the crank assembly being rotatable about a crank axis that is spaced rearward from the down tube axis. The ebike frame assembly can further comprise a battery assembly at least partially secured in the down tube in an installed position and being slidable into the down tube from the lower end of the down tube along the down tube axis.

Clause 13: In these or other embodiments, the battery assembly can comprise a lower end that protrudes from the lower end of the down tube when in the installed position.

Clause 14: In these or other embodiments, the battery can comprise a battery housing protruding from the lower end of the down tube when in the installed position and a lower end of the battery housing. The battery can also comprise a battery cover secured to the lower end of the battery housing and substantially enclosing the lower end of the battery housing when the battery assembly is in the installed position.

Clause 15: In these or other embodiments, at least a portion of the battery housing can extend below a horizontal plane defined by the crank axis.

Clause 16: In these or other embodiments, the battery housing can comprise a housing length and the battery housing can protrude from the lower end of the down tube by a distance that is at least 10% of the housing length.

Clause 17: In these or other embodiments, the battery cover can comprise an energy-absorbing zone that protects the battery housing.

Clause 18: In these or other embodiments, the energy-absorbing zone can comprise a honeycomb cell structure.

Clause 19: In these or other embodiments, the battery cover can comprise a skid plate spaced from the battery housing by a gap, and the lower end of the down tube can be at least partially positioned in the gap.

Clause 20: In these or other embodiments, the battery cover can comprise a recess that facilitates engagement of a finger of a user to remove the battery assembly from the down tube.

Clause 21: Some embodiments include an ebike. The ebike can comprise a front wheel, a rear wheel, and a frame structure supported on the front wheel and the rear wheel, the frame structure including a main frame and further including a rear frame pivotally coupled to the main frame at a lower pivot axis defining a horizontal plane, wherein the main frame includes a head tube, a down tube, a seat tube, and a bottom shell coupling the down tube to the seat tube, the bottom shell including sidewalls at least partially defining a hollow interior. The ebike can further comprise a motor assembly having an upper motor portion positioned in the hollow interior of the bottom shell and a lower motor portion hanging below the bottom shell, the motor assembly being secured to the bottom shell by a lower fastener below the horizontal plane and an upper fastener above the horizontal plane.

Clause 22: In these or other embodiments, the bottom shell can comprise a downwardly facing opening at least partially defined by lower edges of the sidewalls.

Clause 23: In these or other embodiments, the ebike can further comprise a battery assembly at least partially positioned in the hollow interior of the bottom shell, the battery assembly including a lower battery portion hanging below the bottom shell.

Clause 24: In these or other embodiments, the down tube can define a down tube axis, and the battery assembly can be slidable from the bottom shell along a battery axis that is parallel to the down tube axis when the motor assembly is secured to the bottom shell.

Clause 25: In these or other embodiments, the lower motor portion and the lower battery portion can be positioned lower than the main frame.

Clause 26: In these or other embodiments, the lower motor portion and the lower battery portion can be positioned lower than the rear frame.

Clause 27: In these or other embodiments, each one of the battery assembly and the motor assembly can be removed from the main frame without another one of the battery assembly and motor assembly being removed from the main frame.

Clause 28: In these or other embodiments, no portion of the main frame can be positioned below the motor assembly, and the ebike further can comprise a motor cover enclosing the lower motor portion.

Clause 29: Some embodiments include an ebike. The ebike can comprise a front wheel, a rear wheel, and a frame structure supported on the front wheel and the rear wheel, the frame structure including a main frame having a head tube, a down tube, a seat tube, and a bottom shell coupling the down tube to the seat tube, the bottom shell including sidewalls at least partially defining a hollow interior. The ebike can further comprise a motor assembly having an upper motor portion positioned in the hollow interior of the bottom shell and a lower motor portion hanging below the bottom shell. The ebike can further comprise a battery assembly at least partially positioned in the hollow interior of the bottom shell, the battery assembly including a lower battery portion hanging below the bottom shell.

Clause 30: In these or other embodiments, the lower motor portion and the lower battery portion can be positioned lower than the main frame.

Clause 31: In these or other embodiments, the lower motor portion and the lower battery portion can be positioned lower than the rear frame.

Clause 32: In these or other embodiments, each one of the battery assembly and the motor assembly can be removed from the main frame without another one of the battery assembly and motor assembly being removed from the main frame.

Clause 33: In these or other embodiments, the down tube can define a down tube axis, and wherein the battery assembly can be slidable from the bottom shell along a battery axis that is parallel to the down tube axis when the motor assembly is secured to the bottom shell.

Clause 34: In these or other embodiments, no portion of the main frame can be positioned below the motor assembly, and the ebike further can comprise a motor cover enclosing the lower motor portion.

Clause 35: Some embodiments include an ebike frame assembly. The ebike frame assembly can comprise a frame structure adapted to be supported on a front wheel and the rear wheel, the frame structure including a main frame having a head tube, a down tube, a seat tube, and a bottom shell coupling the down tube to the seat tube, the bottom shell including sidewalls at least partially defining a hollow interior. The ebike frame assembly can further comprise a motor assembly having an upper motor portion positioned in the hollow interior of the bottom shell and a lower motor portion hanging below the bottom shell. The ebike frame assembly can further comprise a battery assembly at least partially positioned in the hollow interior of the bottom shell, the battery assembly including a lower battery portion hanging below the bottom shell.

Clause 36: In these or other embodiments, the lower motor portion and the lower battery portion can be positioned lower than the main frame when the frame structure is supported on the front wheel and the rear wheel.

Clause 37: In these or other embodiments, the frame structure can further comprise a rear frame coupled to the main frame. The lower motor portion and the lower battery portion can be positioned lower than the rear frame when the frame structure is supported on the front wheel and the rear wheel.

Clause 38: In these or other embodiments, each one of the battery assembly and the motor assembly can be removed from the main frame without another one of the battery assembly and motor assembly being removed from the main frame.

Clause 39: In these or other embodiments, the down tube can define a down tube axis, and the battery assembly can be slidable from the bottom shell along a battery axis that is parallel to the down tube axis when the motor assembly is secured to the bottom shell.

Clause 40: In these or other embodiments, no portion of the main frame can be positioned below the motor assembly when the frame structure is supported on the front wheel and the rear wheel, and wherein the ebike frame assembly can further comprise a motor cover enclosing the lower motor portion.

Clause 41: Some embodiments include an ebike. The ebike can comprise a front wheel, a rear wheel, and a frame structure supported on the front wheel and the rear wheel, the frame structure including a hollow tube having a converging inner surface. The ebike can further comprise a battery assembly configured to be coupled to the frame structure in an installed position at least partially in the hollow tube, wherein the converging inner surface can be configured such that at least a portion of the battery assembly is supported within the hollow tube by the converging inner surface when the battery assembly is at least partially positioned in the hollow tube.

Clause 42: In these or other embodiments, the hollow tube can comprise an end, and the end of the hollow tube can comprise an opening adapted to receive the battery assembly and permit the battery assembly to be inserted into the hollow tube, and wherein the converging inner surface can converge away from the opening.

Clause 43: In these or other embodiments, the frame structure can comprise a front fork supported on the front wheel, and a head tube coupled to the front fork, and wherein the hollow tube can comprise a down tube extending downward and rearward from the head tube.

Clause 44: In these or other embodiments, the down tube can comprise a lower end, and the lower end of the down tube can comprise an opening.

Clause 45: In these or other embodiments, the battery assembly can comprise a lower end, and wherein the lower end of the battery assembly can protrude from the lower end of the down tube when the battery assembly is in the installed position.

Clause 46: In these or other embodiments, the battery assembly can comprise a battery housing and a resilient lateral support, and wherein the resilient lateral support can resiliently laterally support a portion of the battery housing in the hollow tube when the battery assembly is in the installed position.

Clause 47: In these or other embodiments, the resilient lateral support can comprise a leaf spring flexure.

Clause 48: In these or other embodiments, the battery assembly can define a battery width across the resilient lateral support in an unstressed condition, wherein the converging inner surface can define an inner width at a location of the resilient lateral support when the battery assembly is in the installed position, and wherein the battery width can be larger than the inner width such that the resilient lateral support is compressed laterally when the battery assembly is in the installed position.

Clause 49: In these or other embodiments, the battery assembly can comprise two resilient lateral supports in opposing relation to each other, and wherein the two resilient lateral supports can comprise the resilient lateral support.

Clause 50: In these or other embodiments, the ebike can further comprise a battery fastener configured to extend through the hollow tube and into the battery assembly when the battery assembly is at least partially positioned in the hollow tube.

Clause 51: Some embodiments include an ebike. The ebike can comprise a front wheel, a rear wheel, and a frame structure supported on the front wheel and the rear wheel, the frame structure including a hollow tube having an inner surface. The ebike can further comprise a battery assembly configured to be coupled to the frame structure in an installed position at least partially in the hollow tube, the battery assembly comprising a battery housing and a resilient lateral support that resiliently laterally supports at least a portion of the battery housing in the hollow tube.

Clause 52: In these or other embodiments, the resilient lateral support can comprise a leaf spring flexure.

Clause 53: In these or other embodiments, the battery assembly can define a battery width across the resilient lateral support in an unstressed condition, wherein the inner surface defines an inner width at a location of the resilient lateral support when the battery assembly is in the installed position, and wherein the battery width can be larger than the inner width such that the resilient lateral support is compressed laterally when the battery assembly is in the installed position.

Clause 54: In these or other embodiments, the battery assembly can comprise two resilient lateral supports in opposing relation to each other.

Clause 55: In these or other embodiments, the hollow tube can comprise an end, and the end of the hollow tube can comprise an opening adapted to receive the battery assembly and permit the battery assembly to be inserted into the hollow tube, and wherein in the installed position one end of the battery assembly can be positioned adjacent the opening, and wherein the resilient lateral support can be positioned adjacent another end of the battery assembly opposite the one end.

Clause 56: In these or other embodiments, the hollow tube can comprise a down tube extending downward and rearward from the head tube, and the down tube can comprise a lower end, and the lower end of the down tube can comprise an opening.

Clause 57: In these or other embodiments, the battery assembly can include a lower end, and wherein the lower end of the battery assembly can protrude from the lower end of the down tube when in the installed position.

Clause 58: In these or other embodiments, the ebike can further comprise a battery fastener extending through the hollow tube and into the battery assembly.

Clause 59: In these or other embodiments, the frame structure can comprise a front fork supported on the front wheel, and a head tube coupled to the front fork.

Clause 60: Some embodiments include an ebike. The ebike can comprise a front wheel, a rear wheel, and a frame structure supported on the front wheel and the rear wheel, the frame structure including a front fork coupled to the front wheel, a head tube coupled to the front fork, a down tube extending downward and rearward from the head tube, a top tube extending rearward from the head tube, a seat tube coupling a rear end of the top tube to a rear end of the down tube, and a diagonal tube coupling the top tube with the seat tube. The ebike can further comprise a motor assembly coupled to the frame structure, a battery assembly configured to be coupled to the frame structure and to be at least partially positioned in the frame structure, a user interface configured to be supported by the frame structure, and an electrical cable coupling the user interface with the motor assembly, the electrical cable being positioned at least partially in the diagonal tube.

Clause 61: In these or other embodiments, the rear wheel can define a center plane, and wherein the diagonal tube can comprise a side tube offset from the center plane.

Clause 62: In these or other embodiments, the battery assembly can be positioned at least partially in the down tube, and wherein an interior of the down tube can be free of electrical cables.

Clause 63: In these or other embodiments, the down tube can define a down tube axis and include a lower end having an opening, and wherein the battery assembly can be configured to be at least partially secured in the down tube in an installed position and can be configured to be slidable from the lower end of the down tube through the opening along the down tube axis.

Clause 64: In these or other embodiments, the battery assembly can comprise a lower end that protrudes from the lower end of the down tube when the battery assembly is in the installed position.

Clause 65: In these or other embodiments, the ebike can comprise a crank assembly supported by the frame structure, the crank assembly being rotatable about a crank axis that is spaced rearward from the down tube axis.

Clause 66: In these or other embodiments, a lower battery portion of the battery assembly can extend below a horizontal plane defined by the crank axis.

Clause 67: In these or other embodiments, the frame structure can further comprise a bottom shell coupling the down tube to the seat tube, the bottom shell including sidewalls at least partially defining a hollow interior, and wherein the motor assembly can comprise an upper motor portion positioned in the bottom shell and a lower motor portion hanging below the bottom shell.

Clause 68: In these or other embodiments, the lower motor portion and the lower battery portion can be positioned lower than the frame structure.

Clause 69: Some embodiments include an ebike frame assembly. The ebike frame assembly can comprise a frame structure adapted to be supported on a front wheel and a rear wheel, the frame structure including a front fork, a head tube coupled to the front fork, a down tube extending downward and rearward from the head tube, a top tube extending rearward from the head tube, a seat tube coupling a rear end of the top tube to a rear end of the down tube, and a diagonal tube coupling the top tube with the seat tube. The ebike frame assembly can further comprise a motor assembly coupled to the frame structure, a battery assembly configured to be coupled to the frame structure and to be at least partially positioned in the frame structure, a user interface configured to be supported by the frame structure, and an electrical cable coupling the user interface with the motor assembly, the electrical cable being positioned at least partially in the diagonal tube.

Clause 70: In these or other embodiments, the frame structure can define a center plane, and wherein the diagonal tube can comprise a side tube offset from the center plane.

Clause 71: In these or other embodiments, the battery assembly can be positioned at least partially in the down tube, and wherein an interior of the down tube can be free of electrical cables.

Clause 72: In these or other embodiments, the down tube can define a down tube axis and include a lower end having an opening, and wherein the battery assembly can be configured to be at least partially secured in the down tube in an installed position and can be configured to be slidable from the lower end of the down tube through the opening along the down tube axis.

Clause 73: In these or other embodiments, the battery assembly can include a lower end that protrudes from the lower end of the down tube when the battery assembly is in the installed position.

Clause 74: In these or other embodiments, the ebike frame assembly can further comprise a crank assembly supported by the frame structure, the crank assembly being rotatable about a crank axis that is spaced rearward from the down tube axis.

Clause 75: In these or other embodiments, a lower battery portion of the battery assembly can extend below a horizontal plane defined by the crank axis.

Clause 76: In these or other embodiments, the frame structure can further comprise a bottom shell coupling the down tube to the seat tube, the bottom shell including sidewalls at least partially defining a hollow interior, and wherein the motor assembly can comprise an upper motor portion positioned in the bottom shell and a lower motor portion hanging below the bottom shell.

Clause 77: In these or other embodiments, the lower motor portion and the lower battery portion can be positioned lower than the frame structure.

Clause 78: Some embodiments include a bicycle. The bicycle can comprise a front wheel, a rear wheel, and a frame structure supported on the front wheel and the rear wheel, the frame structure including a hollow seat tube. The bicycle can further comprise a dropper seat post supported by the hollow seat tube, a loop stay positioned in the frame structure below the dropper seat post, and a control housing positioned in the frame structure, wherein the control housing can be coupled to the dropper seat post and can be configured to actuate the dropper seat post, and wherein the control housing can comprise a lower loop wrapped around at least a portion of the loop stay.

Clause 79: In these or other embodiments, the frame structure can further comprise a top tube and a diagonal tube coupling the top tube with the hollow seat tube, wherein the control housing can be at least partially positioned in the diagonal tube.

Clause 80: In these or other embodiments, the rear wheel can define a center plane, and the diagonal tube can comprise a side tube offset from the center plane.

Clause 81: In these or other embodiments, the diagonal tube can intersect and form an acute upper angle with the hollow seat tube at an intersection.

Clause 82: In these or other embodiments, the lower loop can be positioned below the intersection and the dropper seat post can be positioned above the intersection.

Clause 83: In these or other embodiments, the lower loop can at least partially be positioned in a portion of the frame structure having a lower inner width, wherein the dropper seat post can be positioned in an upper portion of the hollow seat tube having an upper inner width, and wherein the lower inner width can be larger than the upper inner width.

Clause 84: In these or other embodiments, the dropper seat post can be positioned in an upper portion of the hollow seat tube having an upper inner width, and wherein the lower loop can have a loop width that is larger than the upper inner width.

Clause 85: In these or other embodiments, the bicycle can further comprise a motor assembly coupled to the frame structure by a motor fastener, wherein the loop stay can be coupled to the frame structure by the motor fastener.

Clause 86: In these or other embodiments, the frame structure can further include a front fork coupled to the front wheel, a head tube coupled to the front fork, and a down tube extending downward and rearward from the head tube, and wherein the bicycle can further include a battery assembly positioned at least partially in the down tube.

Clause 87: In these or other embodiments, the down tube can define a down tube axis and include a lower end with an opening, and wherein the battery assembly can be secured at least partially in the down tube in an installed position and can be slidable through the opening in the lower end of the down tube along the down tube axis.

Clause 88: Some embodiments include a bicycle. The bicycle can comprise a frame structure including a hollow seat tube, a dropper seat post supported by the hollow seat tube, a loop stay positioned in the frame structure below the dropper seat post, and a control housing positioned in the frame structure, wherein the control housing can be coupled to the dropper seat post and ca be configured to actuate the dropper seat post, and wherein the control housing can comprise a lower loop wrapped around at least a portion of the loop stay.

Clause 89: In these or other embodiments, the frame structure can further comprise a top tube and a diagonal tube coupling the top tube with the hollow seat tube, and wherein the control housing can be at least partially positioned in the diagonal tube.

Clause 90: In these or other embodiments, the frame structure can further include a head tube defining a center plane, and wherein the diagonal tube can comprise a side tube offset from the center plane.

Clause 91: In these or other embodiments, the diagonal tube can intersect and form an acute upper angle with the hollow seat tube at an intersection.

Clause 92: In these or other embodiments, the lower loop can be positioned below the intersection and the dropper seat post can be positioned above the intersection.

Clause 93: In these or other embodiments, the lower loop can be positioned in a portion of the frame structure having a lower inner width, wherein the dropper seat post can be positioned in an upper portion of the hollow seat tube having an upper inner width, and wherein the lower inner width can be larger than the upper inner width.

Clause 94: In these or other embodiments, the dropper seat post can be positioned in an upper portion of the hollow seat tube having an upper inner width, and wherein the lower loop can have a loop width that is larger than the upper inner width.

Clause 95: In these or other embodiments, the frame structure can be configured to be coupled to a motor assembly by a motor fastener, and wherein the loop stay can be configured to be coupled to the frame structure by the motor fastener.

Clause 96: In these or other embodiments, the frame structure can further include a front fork configured to be coupled to a front wheel, a head tube coupled to the front fork, and a down tube extending downward and rearward from the head tube.

Clause 97: In these or other embodiments, the down tube can define a down tube axis and include a lower end with an opening, wherein the opening can be configured to receive a battery assembly, and wherein the battery assembly can be configured to be secured at least partially in the down tube in an installed position and to be slidable through the opening in the lower end of the down tube along the down tube axis.

Clause 98: Some embodiments includes an ebike. The ebike can comprise a front wheel, a rear wheel, a frame structure supported on the front wheel and the rear wheel, a motor controller coupled to the frame structure, and a speed sensor assembly coupled to the frame structure for sensing rotational speed of at least one of the front wheel or the rear wheel. The speed sensor assembly can comprise a sensor unit coupled to the frame structure adjacent to the at least one of the front wheel or the rear wheel, the sensor unit having two ends, a length between the two ends, and a maximum sensor width measured perpendicular to the length. The speed sensor assembly can further comprise a sensor wire secured to an end of the two ends of the sensor unit and coupling the sensor unit to the motor controller, wherein the sensor wire can include an outer housing having a housing width that is at least 25% of the maximum sensor width.

Clause 99: In these or other embodiments, the housing can have a width that is at least 30% of the maximum sensor width.

Clause 100: In these or other embodiments, the housing width can be at least 40% of the maximum sensor width.

Clause 101: In these or other embodiments, the housing width can be at least 50% of the maximum sensor width.

Clause 102: In these or other embodiments, the sensor unit can be free of an integral mounting structure.

Clause 103: In these or other embodiments, the ebike can further comprise a sensor mount secured to the frame structure, wherein the sensor unit can be sandwiched between the sensor mount and the frame structure.

Clause 104: In these or other embodiments, the sensor mount can include a first recess shaped to receive the sensor unit and a second recess shaped to receive the sensor wire.

Clause 105: In these or other embodiments, the second recess can be shaped to receive the sensor wire in a first configuration, and wherein the sensor mount can further include a third recess adapted to receive the sensor wire in a second configuration different than the first configuration.

Clause 106: In these or other embodiments, the frame structure can include a chainstay, and wherein the sensor mount can be secured to the chainstay.

Clause 107: Some embodiments include a bicycle frame assembly. The frame assembly can comprise a front wheel, a rear wheel, a frame structure, a motor controller coupled to the frame structure, and a speed sensor assembly coupled to the frame structure and configured to sense rotational speed of at least one of the front wheel or the rear wheel. The speed sensor assembly can comprise a sensor unit coupled to the frame structure and having two ends, a length between the two ends, and a maximum sensor width measured perpendicular to the length. The speed sensor assembly can further comprise a sensor wire secured to an end of the two ends of the sensor unit and coupling the sensor unit to the motor controller, wherein the sensor wire can include an outer housing having a housing width that is at least 25% of the maximum sensor width.

Clause 108: In these or other embodiments, the housing width can be at least 30% of the maximum sensor width.

Clause 109: In these or other embodiments, the housing width can be at least 40% of the maximum sensor width.

Clause 110: In these or other embodiments, the housing width can be at least 50% of the maximum sensor width.

Clause 111: In these or other embodiments, the sensor unit can be free of an integral mounting structure.

Clause 112: In these or other embodiments, the bicycle frame assembly can further comprise a sensor mount secured to the frame structure, wherein the sensor unit can be sandwiched between the sensor mount and the frame structure.

Clause 113: In these or other embodiments, the sensor mount can include a first recess shaped to receive the sensor unit and a second recess shaped to receive the sensor wire.

Clause 114: In these or other embodiments, the second recess can be shaped to receive the sensor wire in a first configuration, and wherein the sensor mount can further comprise a third recess adapted to receive the sensor wire in a second configuration different than the first configuration.

Clause 115: In these or other embodiments, the frame structure can include a chainstay, and the sensor mount can be secured to the chainstay.

Figure 3:
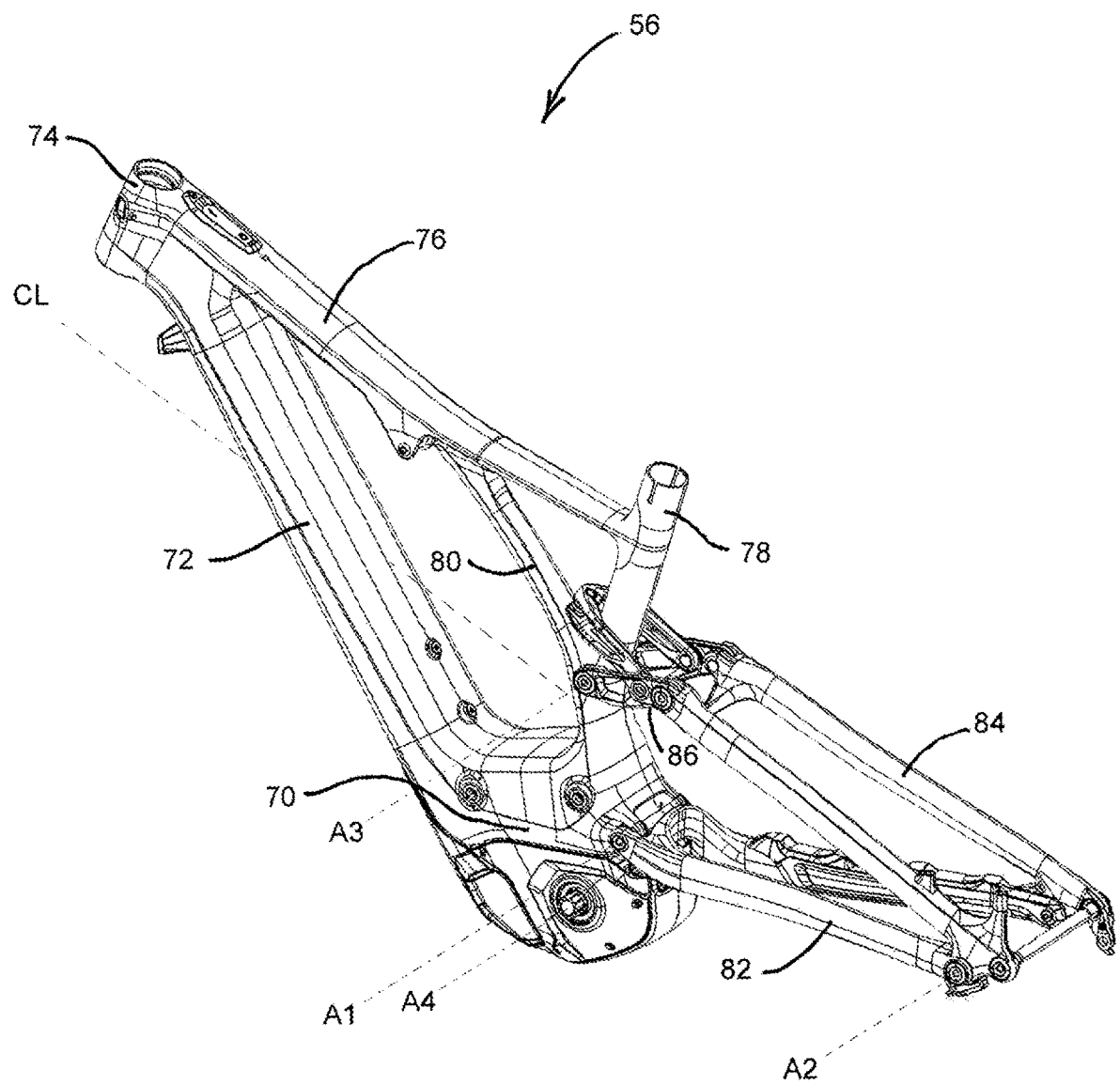
FIG. 3 is a left rear perspective view of the frame assembly in FIG. 2.
Figure 4:
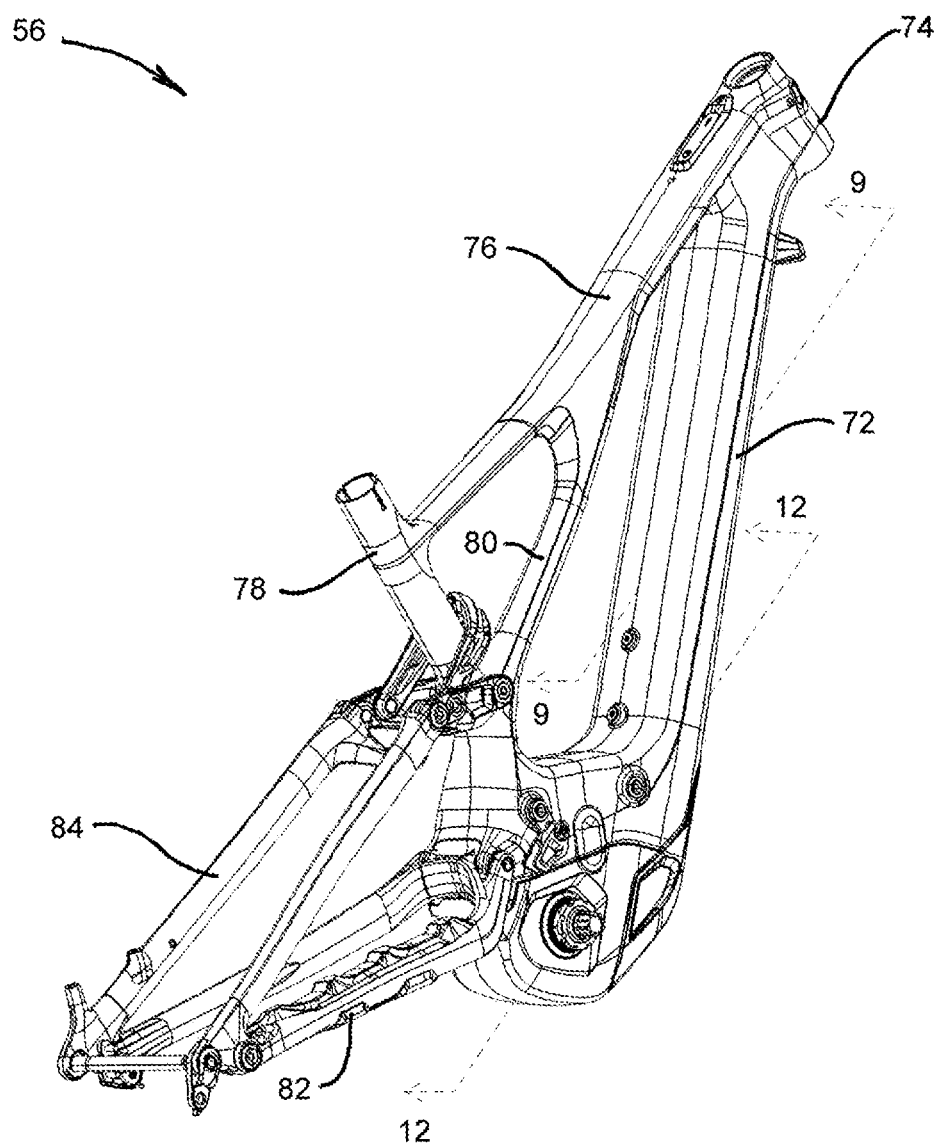
FIG. 4 is a right rear perspective view of the frame assembly in FIG. 2.

Referring now to the illustrated embodiment, FIGS. 1-4 illustrate an ebike 50 having a front wheel 52, a rear wheel 54, and a frame assembly 56 coupled to and supported on the front wheel 52 and rear wheel 54. The frame assembly 56 can include a battery assembly 58, a motor assembly 60, and a frame structure 62. Further, the frame structure 62 can include a main frame 64, a front fork 66 rotationally coupled to and supported on a front part of the main frame 64, and a rear frame 68 coupled (e.g., pivotally coupled) to and supported on a rear part of the main frame 64). The main frame 64 can include a bottom shell 70 and multiple hollow tubes, such as, for example, a down tube 72, a head tube 74, a top tube 76, a seat tube 78, and a diagonal tube in the form of a side tube 80. Side tube 80 can connect top tube 76 to seat tube 78. For example, side tube 80 can connect a mid-portion of the top tube 76 with a mid-portion of the seat tube 78. The bottom shell 70 has primarily a uniform wall thickness. The side tube 80 can be offset to the right side of a vertical center plane defined by a center plane of the rear wheel, which extends through a main frame centerline CL (FIG. 3). Alternatively, the side tube 80 can be aligned with a vertical center plane extending through the main frame centerline CL. In some embodiments, the vertical center plane also can be defined by a seat tube axis of the seat tube 78 and the main frame centerline CL (FIG. 3). The side tube 80 can connect the top tube 76 with the seat tube 78 such that the hollow interiors of those tubes are interconnected. The side tube 80 can be asymmetric to the centerline CL of the main frame 64. For example, the side tube 80 can be located to one side (e.g., a right side) of the centerline CL of the main frame 64. In these or other embodiments, there can be no other side tube on the other side (e.g., a left side) of the centerline CL of the main frame 64. However, in other embodiments, there can be another side tube on the other side (e.g., a left side) of the centerline CL of the main frame 64.

The rear frame 68 can include chainstays 82 coupled (e.g., pivotally coupled) to the bottom shell 70 of the main frame 64. For example, when chainstays 82 are pivotally coupled to the bottom shell 70 of the main frame 64, the chainstays 82 can pivot about a lower pivot axis A1.

Further, the rear frame 68 can include seatstays 84 coupled (e.g., pivotally coupled) to rear ends of the chainstays 82. For example, when seatstays 84 are pivotally coupled to the rear ends of the chainstays 82, the seatstays 84 can pivot about a rear pivot axis A2. Front ends of the seatstays 84 can be coupled (e.g., pivotally coupled) to a pivot link 86, which is coupled (e.g., pivotally coupled) to the seat tube 78 at a link pivot axis A3 positioned at an intersection of the side tube 80 with the seat tube 78.

The ebike 50 further can include a dropper seat post 88 secured to the seat tube 78 and supporting a saddle 90. Handlebars 92 can be coupled to the front fork 66 to facilitate steering of the ebike 50. A user interface 93, such as buttons or a touchscreen, is optional and can be mounted on the handlebars 92 to provide a means for the user to communicate with the ebike 50. A crank assembly 94 can be rotationally supported by the motor assembly 60 to permit pedaling of the ebike 50. The crank assembly 94 can rotate about a crank axis A4.

Figure 5:
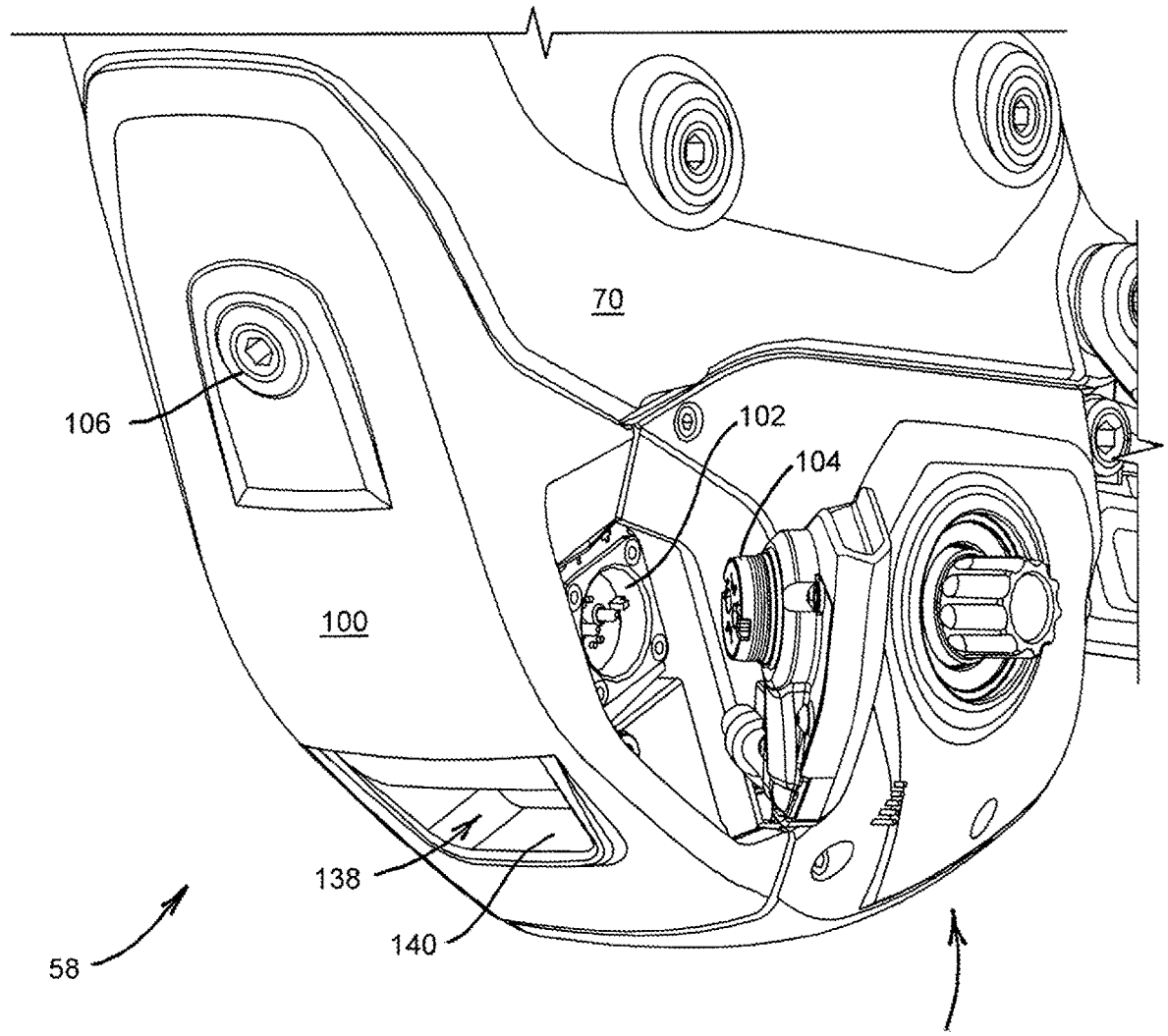
FIG. 5 is an enlarged front perspective view of a bottom shell area of the frame assembly in FIG. 2.
Figure 6:
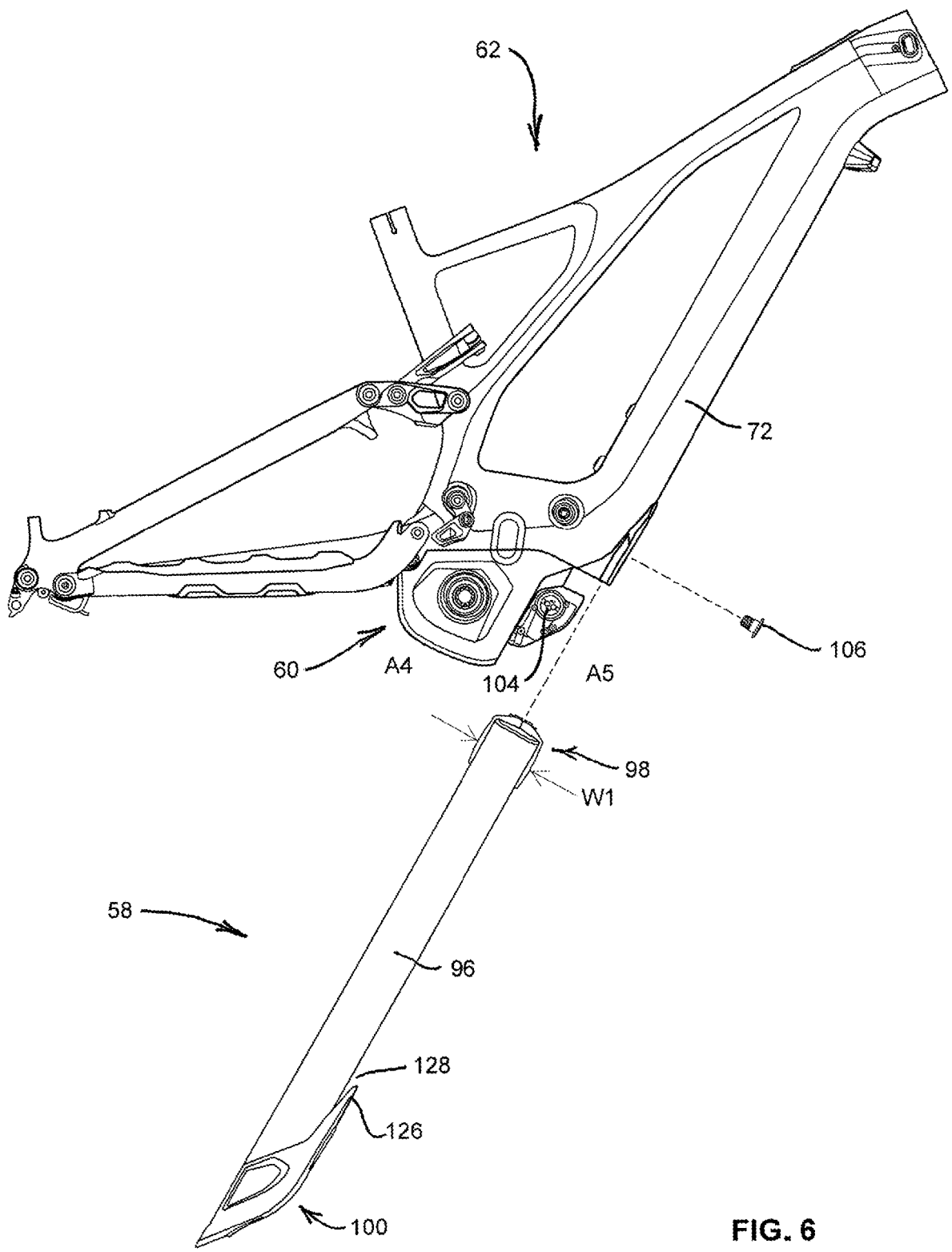
FIG. 6 is a right side view of the frame assembly in FIG. 2 shown with the battery assembly exploded.
Figure 7:
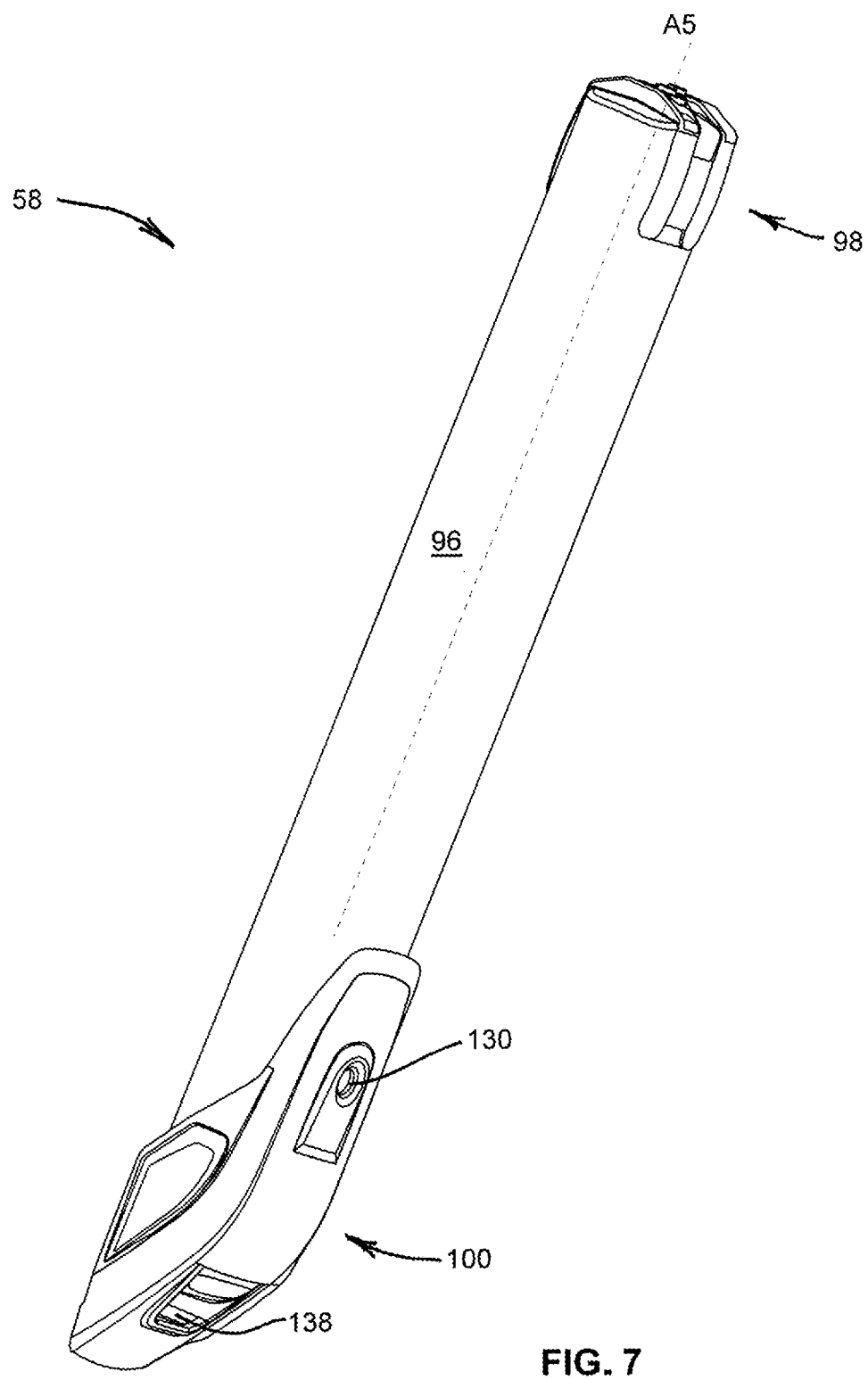
FIG. 7 is a perspective view of the battery assembly shown in FIG. 6.

Referring to FIGS. 5-7, the battery assembly 58 can include a battery housing 96, an upper battery mount 98, a battery cover 100, and a battery socket 102 on its lower end near the motor assembly 60. The battery housing 96 can comprise a sealed, substantially rigid structure that houses battery cells (not shown). The battery socket 102 can be mounted in the battery housing 96 and provides an electrical conduit for electrically coupling the battery cells to the electrical components of the ebike 50. The battery socket 102 can be designed to receive a battery plug 104 that is electrically coupled to the motor assembly 60 and other electrical components of the ebike 50. When the battery plug 104 can be plugged into the battery socket 102, the battery assembly 58 can communicate with and can provide electricity to other electrical components of the ebike 50. In order to recharge the battery cells, the battery plug 104 can be removed from the battery socket 102, and a recharging plug (not shown) can be plugged into the battery socket 102.

Referring to FIG. 6, the battery assembly 58 can be partially positioned in the down tube 72 and can be designed to be slid out of the down tube 72 at a location near the bottom shell 70. In order to remove the battery assembly 58 from the down tube 72, the battery plug 104 first can be unplugged from the battery socket 102, and then a battery fastener 106 can be unthreaded and removed from a lower part of the battery assembly 58. At that point, the battery assembly 58 can be slid downward along a battery axis A5 parallel to the down tube 72. Alternatively, the battery assembly 58 can be inserted into the down tube 72 through an opening in a side of the down tube 72.

With further reference to FIG. 6, it can be seen that the battery axis A5 along which the battery assembly 58 is inserted and removed can be offset in front of the crank axis A4. That is, the crank axis A4 can be spaced rearward of the battery axis A5 (i.e., such that the crank axis A4 is disposed between the battery axis A5 and the rear wheel 54 along a horizontal plane HP1 (seen in FIG. 16) that is defined by the crank axis A4 and is parallel to the ground). In addition, as better shown in FIG. 16, when the battery assembly 58 is installed in the down tube 72 in an installed position, the lower end of the battery housing 96 can protrude from a lower end of the down tube 72 and can be positioned below the horizontal plane HP1. In some embodiments, the battery housing has a length L of about 580 millimeters and the battery housing 96 can protrude beyond the end of the down tube by a distance D1 of about 70 millimeters. In some embodiments the length L can be 580 millimeters+/−20 percent (%). In some embodiments the distance D1 can be 70 millimeters+/−20 percent (%). In this regard, it can be seen that the battery housing 96 can protrude beyond the end of the down tube 72 by a distance D1 that is at least 5 percent (%) or at least 10 percent (%) of the length L of the battery housing 96. Such positioning of the battery assembly 58 can result in a center of mass of the battery assembly 58 being positioned lower than in other configurations, which can improve handling and maneuverability of the ebike 50. Alternatively, the battery assembly 58 can be inserted all the way into the down tube 72.

Figure 8:
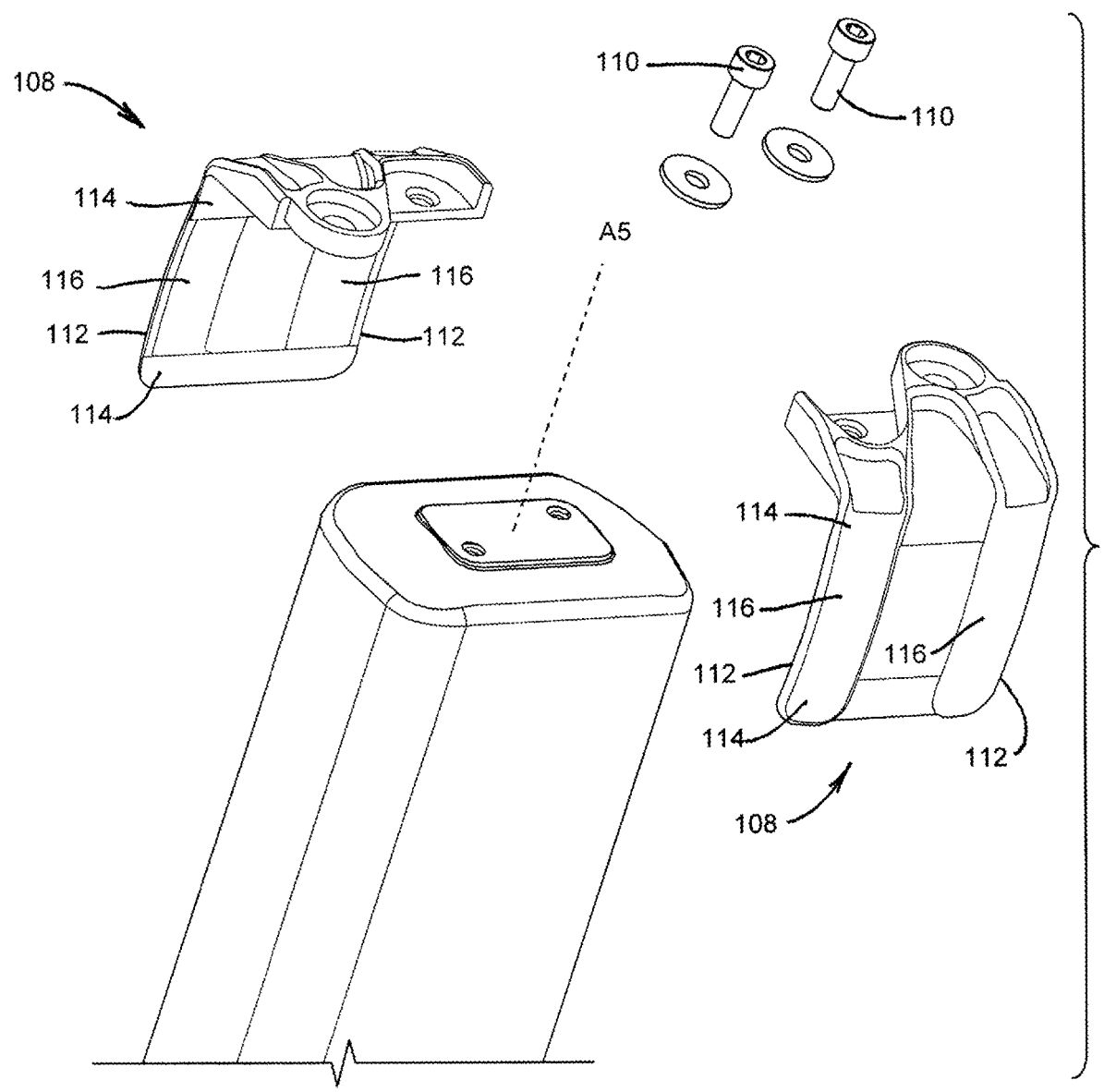
FIG. 8 is a perspective view of an upper portion of the battery assembly in FIG. 7 shown with an upper mount exploded.
Figure 9:
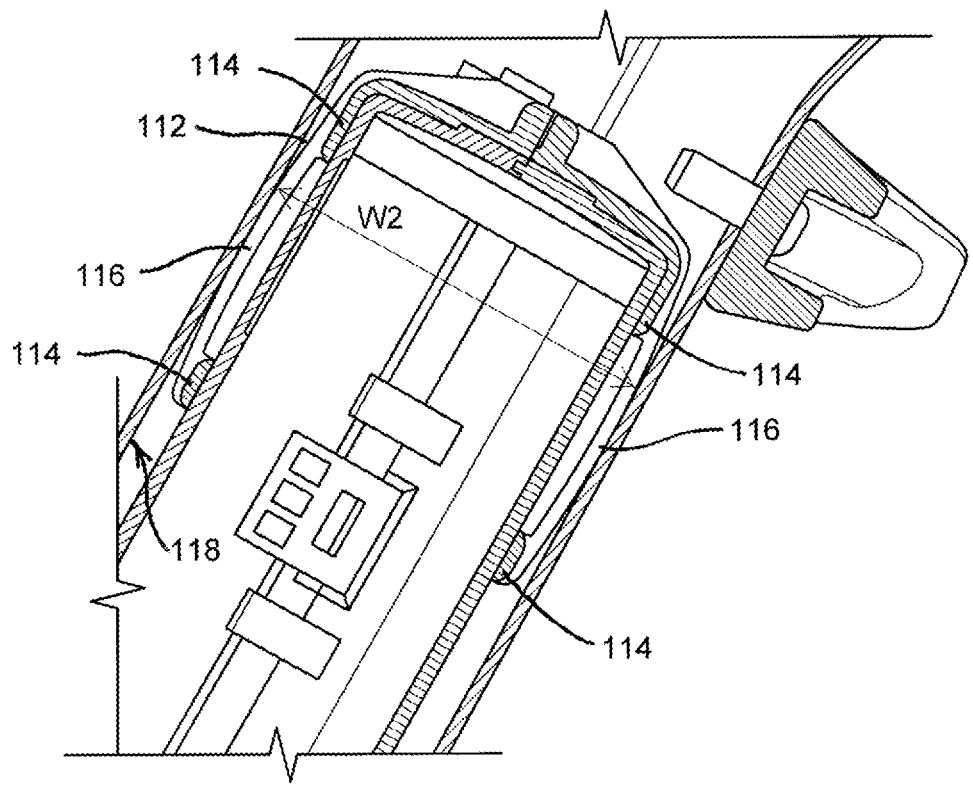
FIG. 9 is a section view of the upper portion of the battery assembly of the frame assembly in FIG. 2 taken along line 9-9 in FIG. 4.
Figure 10:
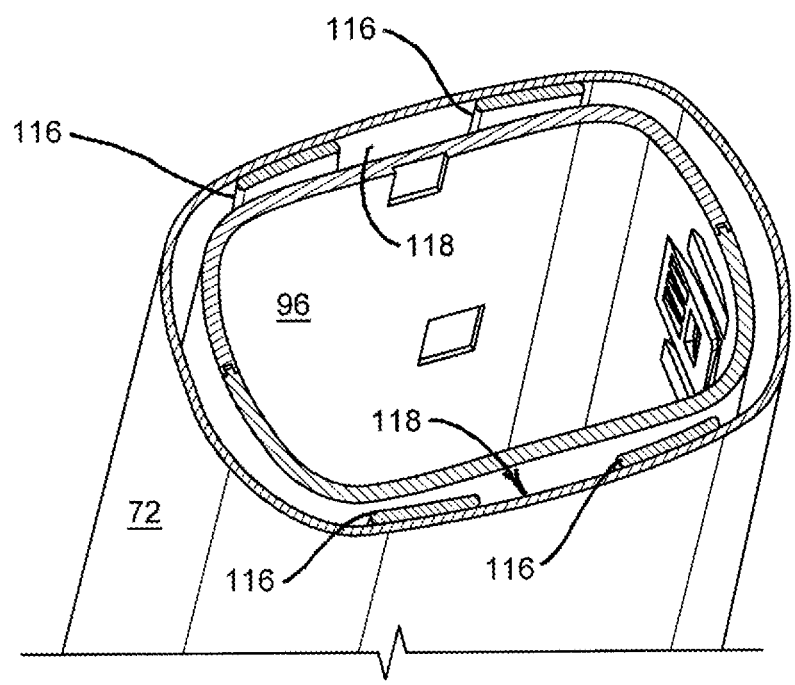
FIG. 10 is a section view of the upper portion of the battery assembly of the frame assembly in FIG. 2 taken along lone 10-10 in FIG. 2.
Figure 11:
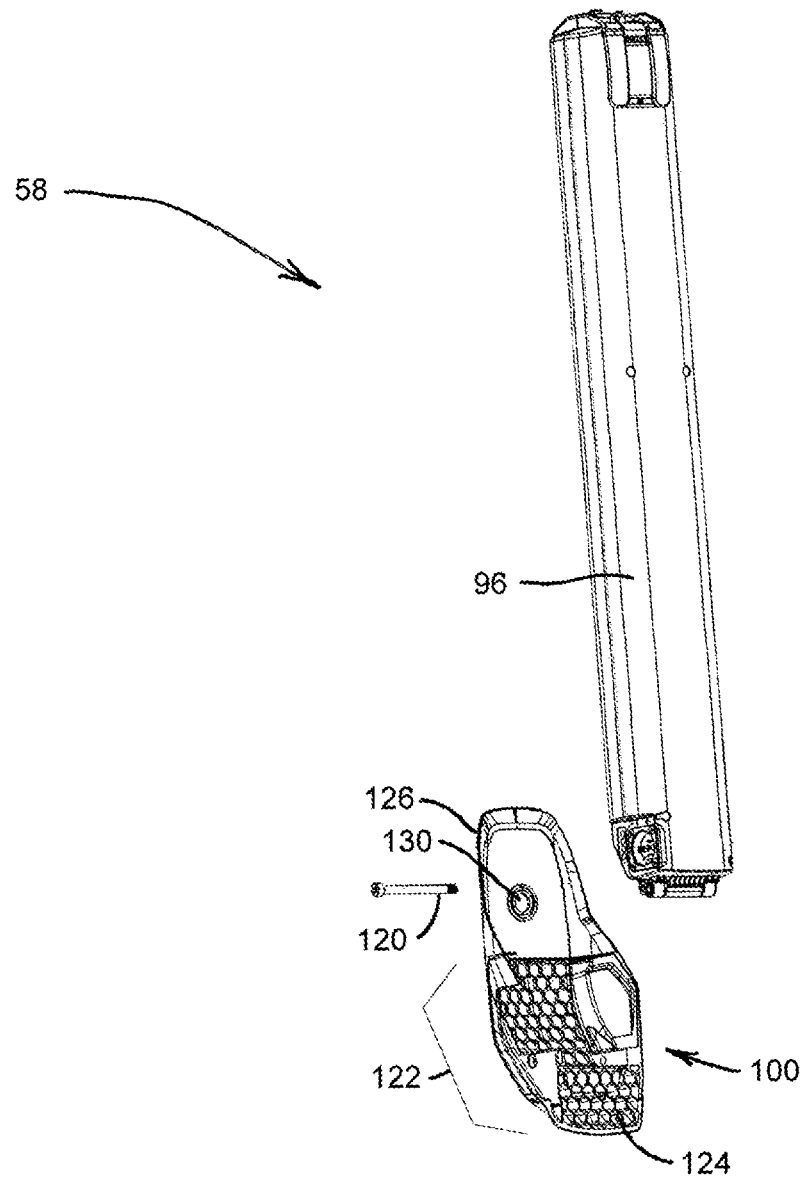
FIG. 11 is a perspective view of the battery assembly in FIG. 7 shown with a battery cover and fastener exploded.

Referring to FIGS. 7-9, the upper battery mount 98 can be attached to the upper end of the battery housing 96 and can include two opposing mount members 108. As shown in FIG. 8, the mount members 108 can be secured to an upper end of the battery housing 96 by threaded mount fasteners 110. Each mount member 108 can include resilient lateral supports that resiliently laterally support the upper end of the battery housing 96 in the down tube 72. "Lateral" refers to a direction in a plane that is substantially perpendicular to the battery axis A5. The illustrated resilient lateral supports can be in the form of two flexures 112 that are slightly curved such that ends 114 of the flexures 112 contact the battery housing 96, and centers 116 of the flexures 112 can be spaced from the battery housing 96. The two flexures 112 of each mount member 108 can be positioned in opposing relation to the two flexures 112 of the other mount member 108. The flexures 112 can be resilient such that pressing the center 116 of a flexure 112 causes the center 116 to flex toward the battery housing 96, and releasing the center 116 of the flexure 112 causes the center 116 to flex back to its original shape. The illustrated flexures 112 are a single-layer leaf spring configuration, but the flexures 112 could instead be any suitable arrangement, such as cantilevered or torsional. Further, while the illustrated flexures 112 are shown as separate pieces attached to the battery housing 96, the flexures 112 could instead be formed integrally with the battery housing 96.

Referring to FIGS. 6 and 9, a width W1 of the upper battery mount 98 across the centers 116 of the uncompressed flexures 112 can be dimensioned to be slightly larger than an interior width W2 of the down tube 72 at the upper end of the down tube 72 at the location where the upper battery mount 98 is positioned when the battery assembly 58 is installed in the down tube 72. This interference fit will result in the flexures 112 flexing inwardly toward the battery housing 96 when the battery assembly 58 is inserted into the down tube 72. This creates a resiliently biased interface between the upper end of the battery assembly 58 and an inner surface 118 of the down tube 72. The flexures 112 can be made of any suitably resilient material, such as reinforced plastic, aluminum, or steel.

In order to facilitate the easy insertion of the battery assembly 58 into the down tube 72, the inner surface 118 of the down tube 72 can be tapered in a converging manner from a larger dimension at its lower end to a smaller dimension at its upper end. When the upper battery mount 98 is first inserted into the lower end of the down tube 72, there can be a loose fit between the upper battery mount 98 and the down tube 72. This can make it easier to initiate insertion of the battery assembly 58 into the down tube 72. As the battery assembly 58 is slid further into the down tube 72, the upper battery mount 98 can slide along the converging taper of the inner surface 118 of the down tube 72. As the upper battery mount 98 approaches the upper end of the down tube 72, the flexures 112 can start to become compressed by the inner surface 118 of the down tube 72. When the upper battery mount 98 is at its fully inserted position, it can be held laterally in place due to the resilient flexing of the flexures 112 against the walls of the down tube 72.

Referring to FIGS. 6, 7, 11, and 12, the battery cover 100 can be secured to a lower end of the battery housing 96, such as, for example, by a fixing bolt 120. The battery cover 100 can be made of an impact-absorbing material, such as Polycarbonate/ABS compound, carbon fiber, aluminum, or any type of plastic, and can provide protection to both the exposed lower end of the battery housing 96 and a lower end of the down tube 72. The battery cover 100 can include an energy-absorbing zone 122 that it designed to absorb impact. For example, the energy-absorbing zone 122 can comprise a honeycomb cell structure 124.

An upper end of the battery cover 100 can include a skid plate 126 that, when the battery cover 100 is secured to the battery housing 96, is spaced from the battery housing 96 by a gap 128. This gap 128 can provide a cavity in which the lower end of the down tube 72 can be positioned when the battery assembly 58 is fully inserted into the frame structure 62. More specifically, as the battery housing 96 is slid into the down tube 72, the skid plate 126 can slide over an outer surface of the lower end of the down tube 72, causing the lower end of the down tube 72 to slide into the gap 128. The result can be that a lower end of the down tube 72 is protected by the skid plate 126.

Figure 12:
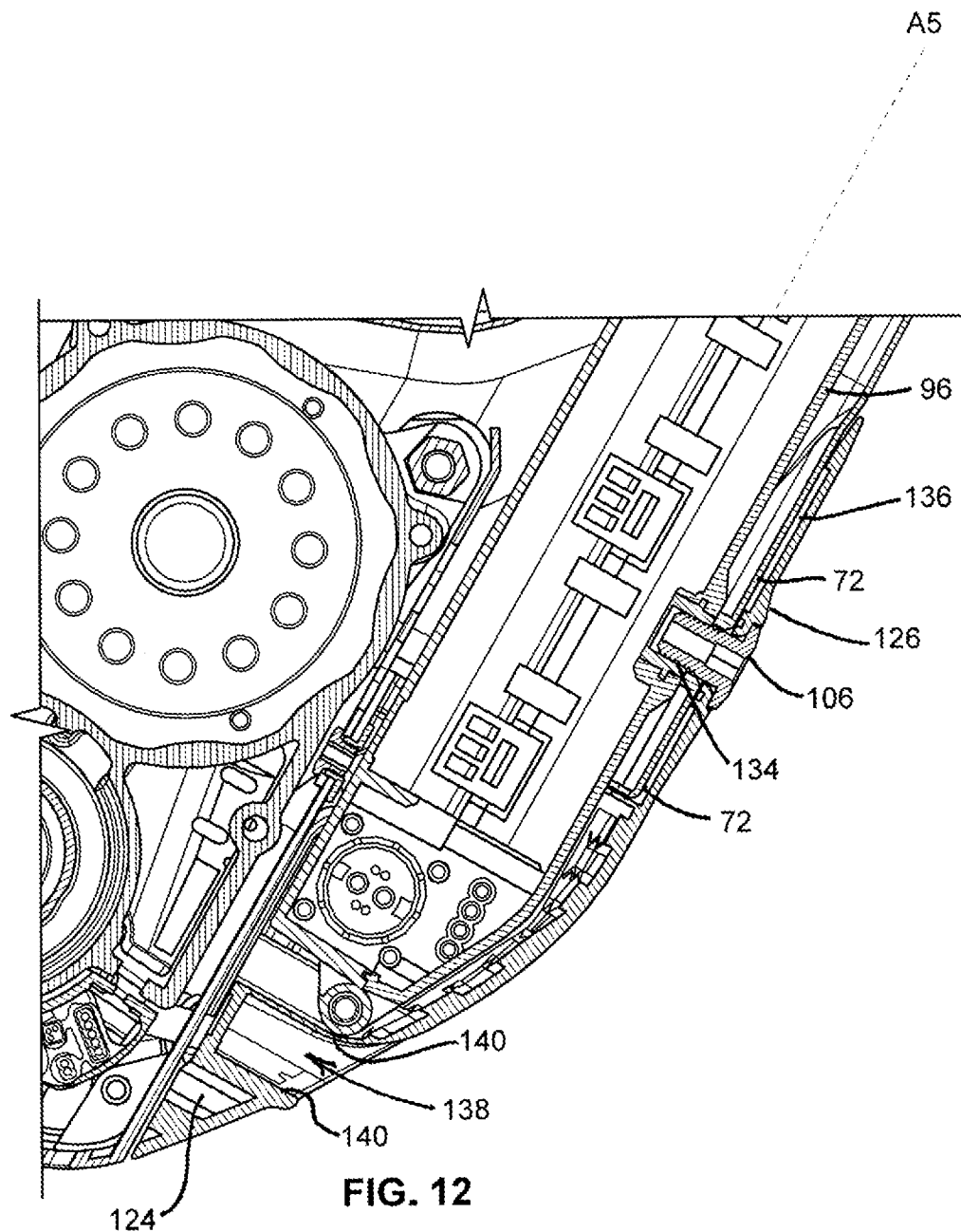
FIG. 12 is a section view of a lower portion of the frame assembly in FIG. 2 taken along line 12-12 in FIG. 4.

Referring to FIGS. 6, 7, and 11-13, the lower end of the battery assembly 58 is secured to the down tube 72 by the battery fastener 106. For example, the battery fastener 106 can be a threaded bolt that is inserted through a plate hole 130 in the skid plate 126, through a tube hole 132 in the down tube 72, and into a threaded hole 134 in the battery housing 96. As shown in FIG. 12, in some embodiments with the battery fastener 106 threaded all the way into the threaded hole 134, there can be a small air gap 136 between the down tube 72 and portions of the skid plate 126. This air gap 136 can facilitate a certain amount of flexing of the skid plate 126 upon impact, thereby providing further protection to the lower end of the down tube 72.

Referring to FIGS. 5, 7, and 12, the lower end of the battery cover 100 can include a finger hold in the form of a recess 138 that can be dimensioned to receive one or more fingers of a user to facilitate removal of the battery assembly 58 from the down tube 72. The recess 138 can be defined by upper and lower walls 140 that are substantially perpendicular to the battery axis A5 to thereby enhance finger engagement. To remove the battery assembly 58, the battery fastener 106 can be removed, and then the user can grab the finger hold and pull the battery assembly 58 downward along the battery axis A5. The finger hold also can provide a convenient way to carry the battery assembly 58 when transporting for charging.

Figure 13:
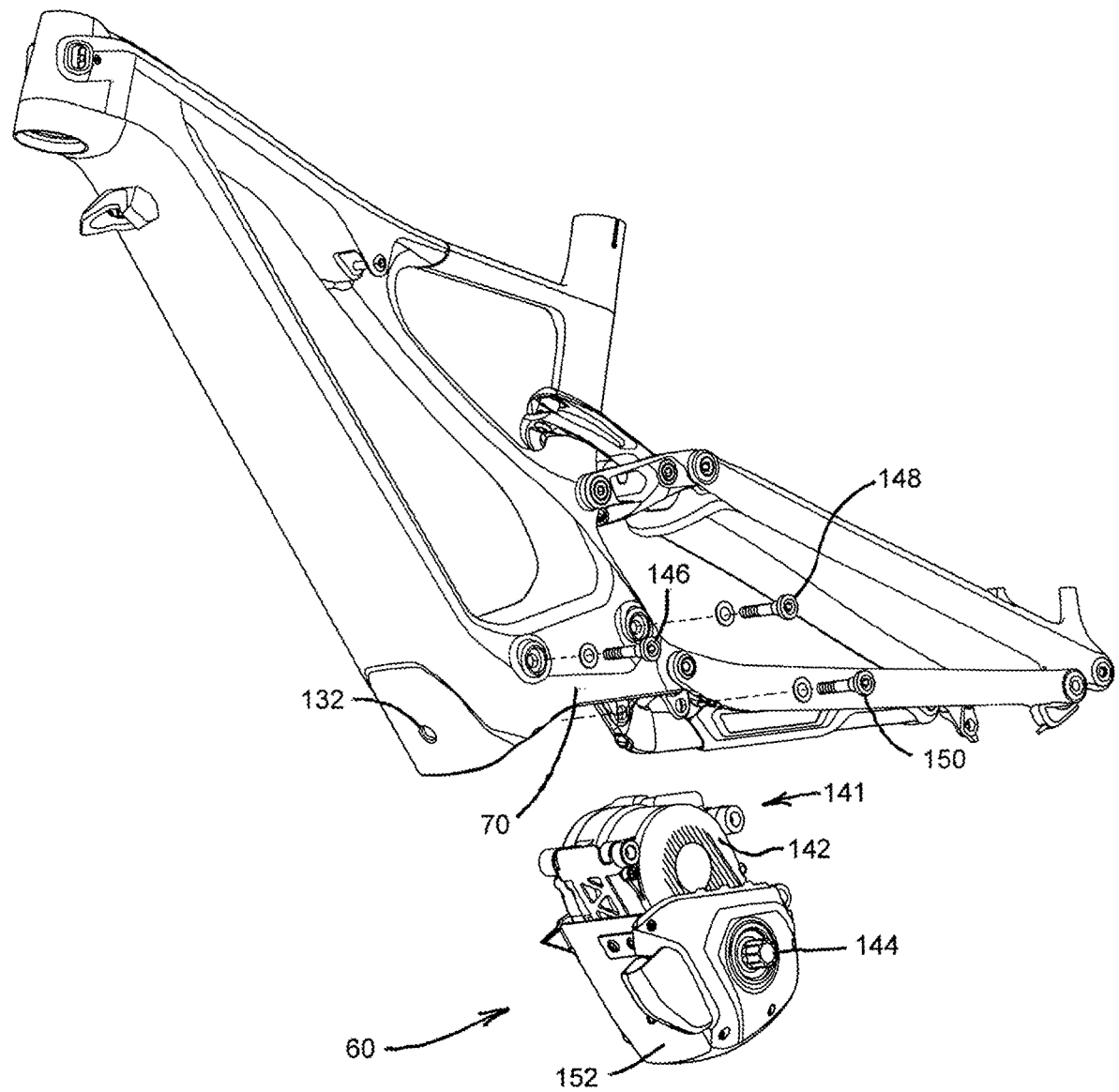
FIG. 13 is a perspective view of the motor assembly of the frame assembly in FIG. 2, including an electric motor and a motor cover, shown exploded from the frame structure of the frame assembly.
Figure 14:
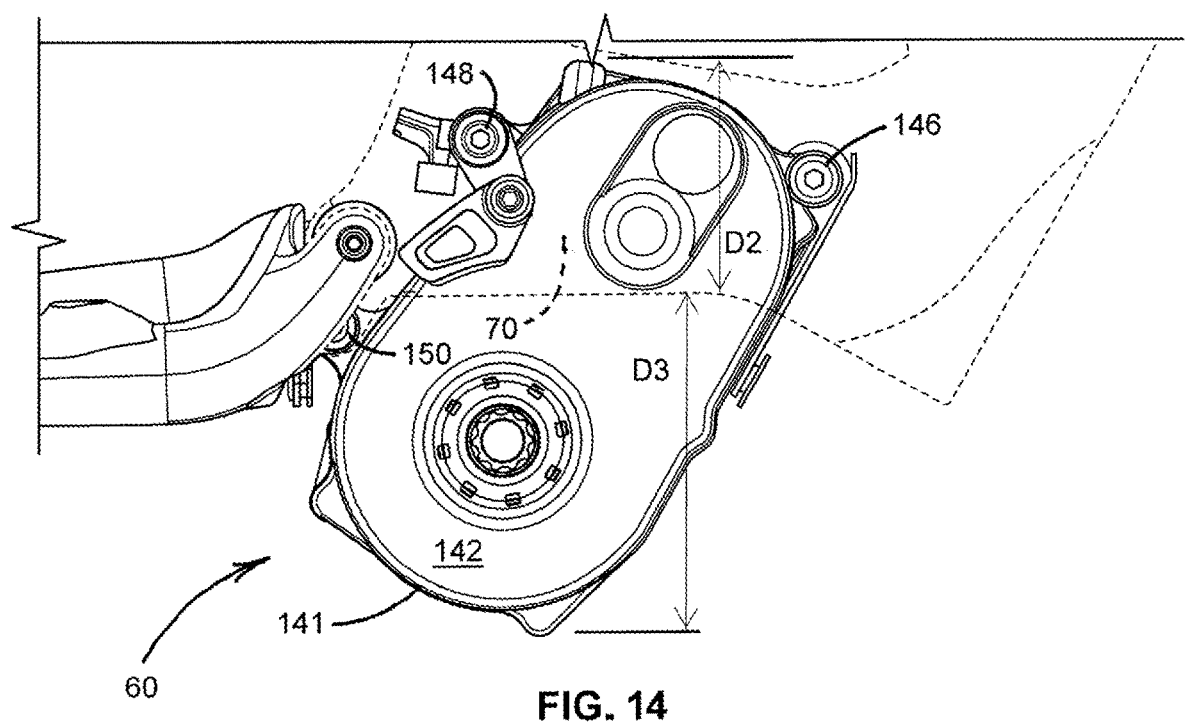
FIG. 14 is a right side view of the frame structure and electric motor in FIG. 13 with the frame structure shown in dashed lines and the motor cover removed.
Figure 15:
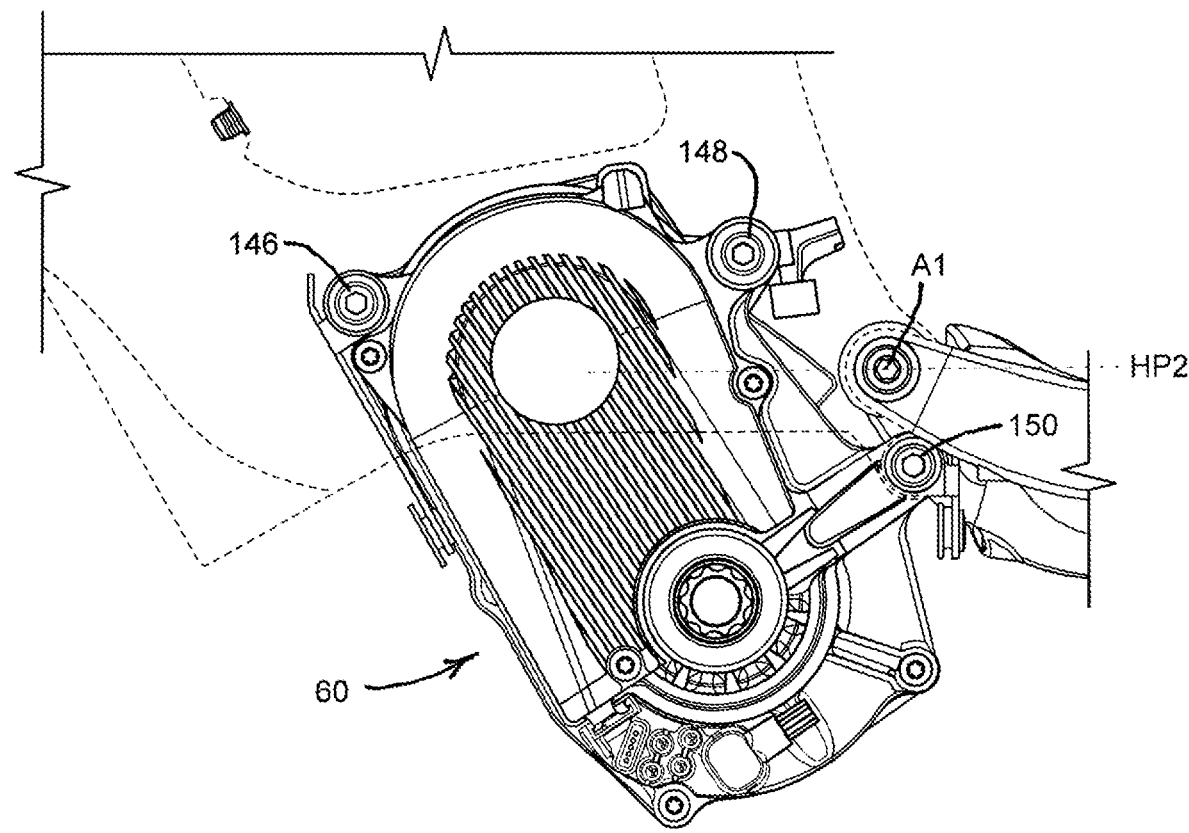
FIG. 15 is a left side view of the frame structure in FIG. 13 and a motor housing of the electric motor in FIG. 13 with the frame structure shown in dashed lines and the motor cover removed.

Referring to FIGS. 13-15, the motor assembly 60 comprises an electric motor 141 having a motor housing 142 and an output shaft 144 that directly drives the crank assembly 94. Each side of the electric motor 141 can be mounted to the bottom shell 70 by a front upper fastener 146, a rear upper fastener 148, and/or a lower fastener 150. Specifically, each of the fasteners 146, 148, 150 can extend through a corresponding opening in the bottom shell 70 and can be threaded into a nut or threaded opening in the motor housing 142. Other types of fasteners can be implemented in other embodiments. Referring to FIG. 15, it can be seen that the lower fastener 150 can be positioned below (lower than) a horizontal plane HP2 that is parallel to the ground through the lower pivot axis A1, and the rear upper fastener 148 can be positioned above (higher than) the horizontal plane HP2. Alternatively, the lower fastener and rear upper fastener both can be positioned above the horizontal plane HP2.

As shown in FIG. 13, the motor assembly 60 further can include a motor cover 152 coupled to the motor housing 142 in order to protect the electric motor 141 from damage due to impact. The motor cover 152 can be made of an impact-absorbing material, such as Polycarbonate/ABS compound, carbon fiber, aluminum, or any type of plastic.

Referring to FIGS. 14-15, it can be seen that the electric motor 141 (as evidenced by the motor housing 142) can be partially recessed into the bottom shell 70 of the frame structure 62, and that a portion (e.g., substantial portion or majority) of the electric motor 141 can hang below the bottom shell 70. In the illustrated embodiment, the distance D2 that the electric motor 141 extends vertically into the bottom shell 70 can be 83 millimeters, and the distance D3 that the electric motor 141 hangs below the bottom shell 70 can be 115 millimeters. In other embodiments the distance D2 can be 80 millimeters+/−20 millimeters. In these and other embodiments the distance D3 can be 120 millimeters+/−20 millimeters. By virtue of this arrangement, the motor housing 142 can be used as a stressed member, and there can be no need to extend the frame structure 62 all the way down to the lower end of the electric motor 141, resulting in a substantial weight reduction to the main frame 64.

Figure 16:
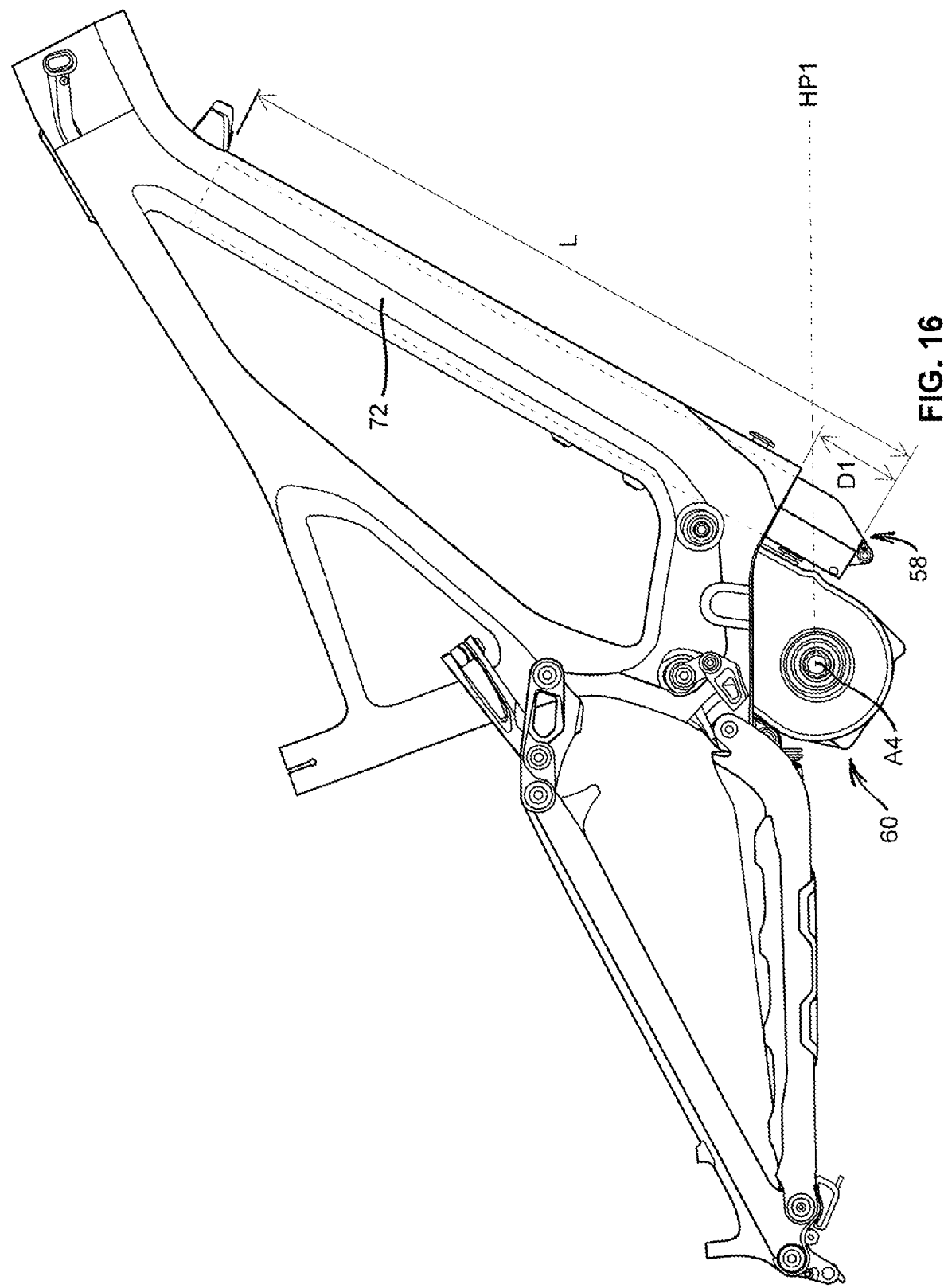
FIG. 16 is a right side view of the frame assembly in FIG. 13 with the motor cover and battery cover removed.
Figure 17:
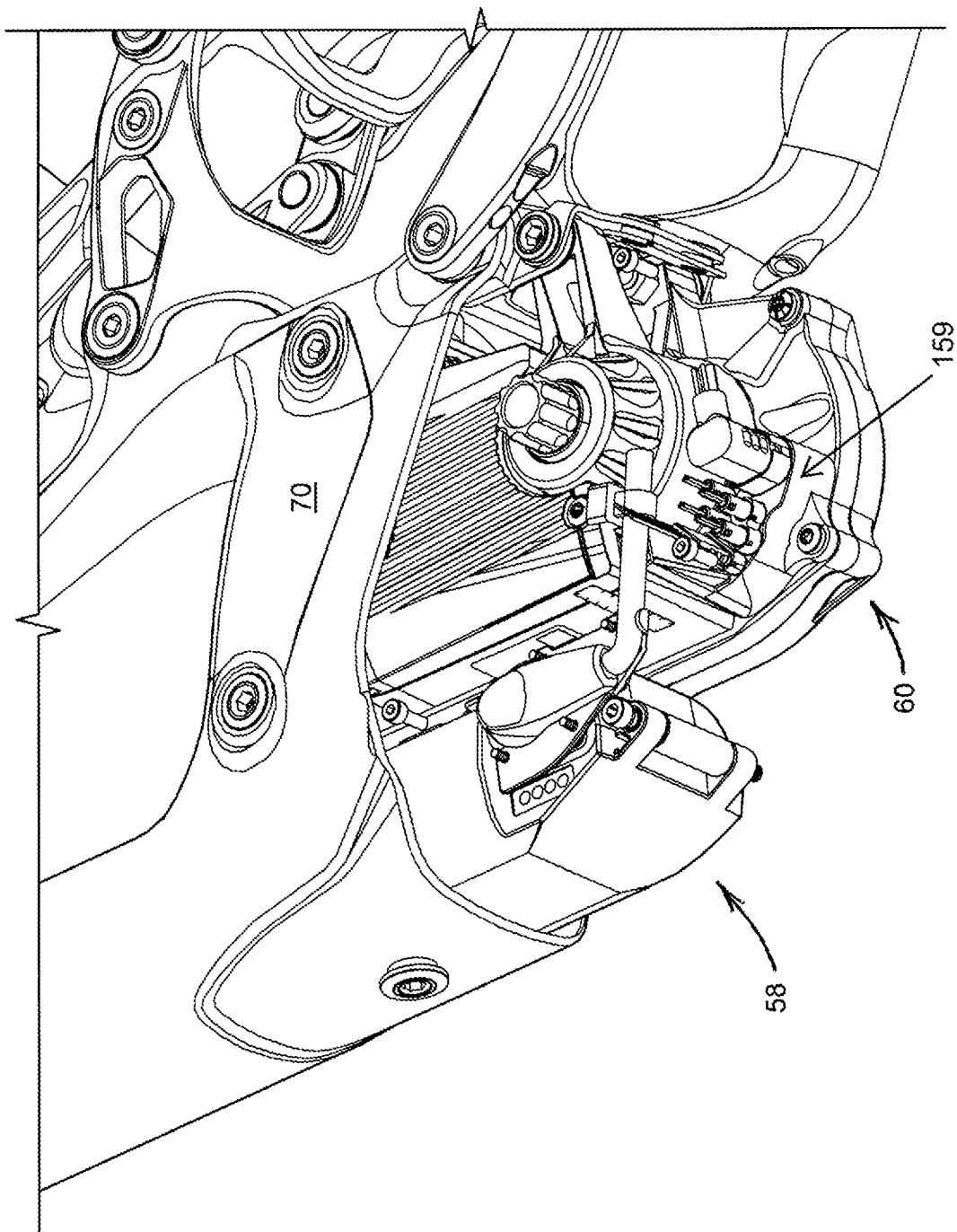
FIG. 17 is a left front perspective view of the frame assembly in FIG. 13 with the motor cover and battery cover removed.

Referring to FIGS. 16-17, it can be seen that both the motor assembly 60 and the battery assembly 58 can extend below a lowermost part of the main frame 64. Such an arrangement can result in a frame structure 62 that is lighter in weight than an implementation positioning the motor assembly 60 and/or the battery assembly 58 above the lowermost part of the main frame 64. In addition, this arrangement can facilitate the removal of the motor assembly 60 and battery assembly 58 from the main frame 64.

Figure 18:
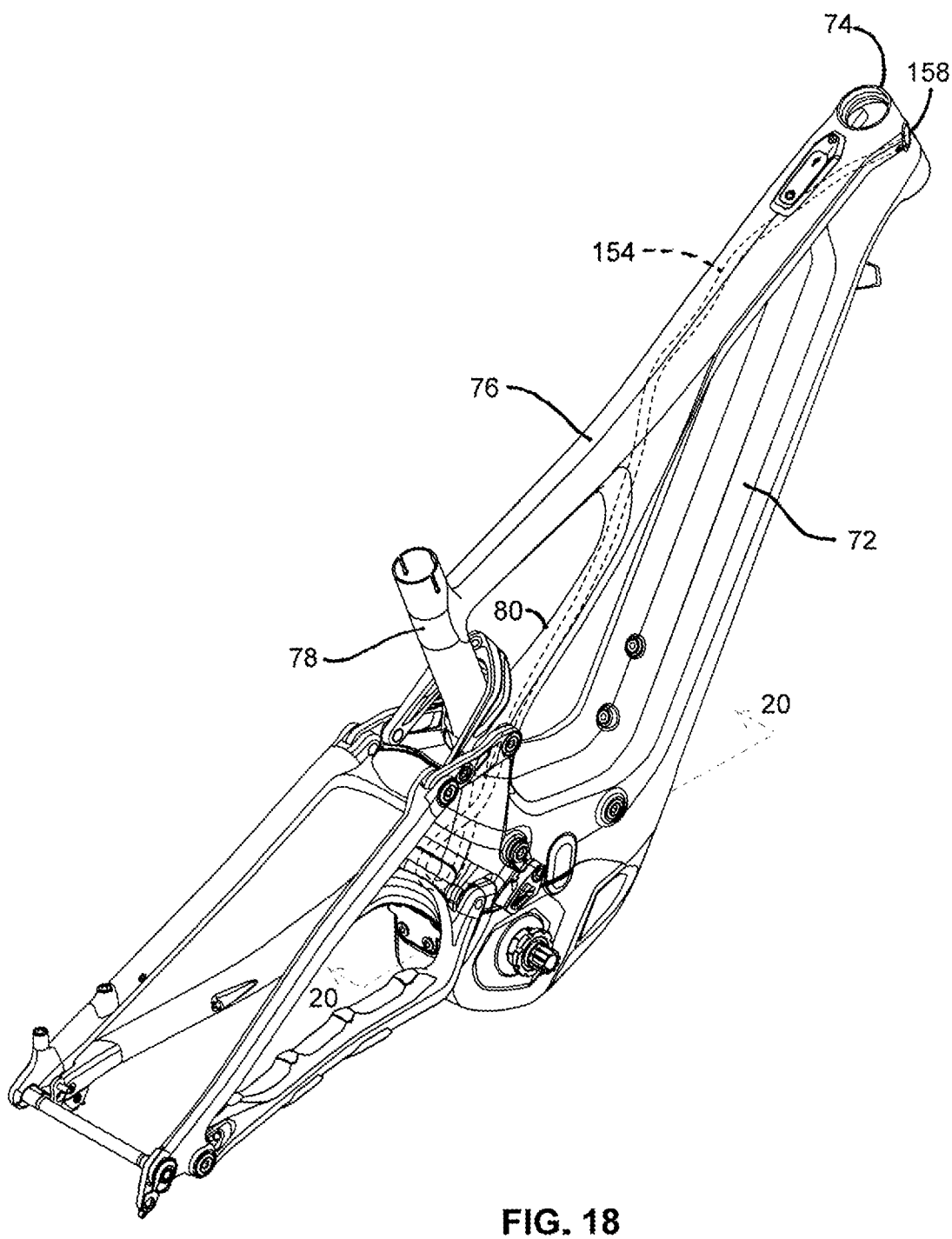
FIG. 18 is a rear perspective view of the frame assembly in FIG. 2 showing the position of an internal routing tube.

Referring to FIG. 18, the ebike 50 further can include an internal routing tube 154 that is adapted to receive and guide multiple actuator housings through the inside of the main frame 64. For example, the actuator housings can be mechanical cable housings, electrical cable housings, or hydraulic fluid housings. In the illustrated embodiment, the routing tube 154 can comprise a hollow tube made of Nylon, carbon fiber, aluminum, or any type of plastic and can have an inner diameter of about 7 millimeters. In other embodiments the inner diameter can be 7 millimeters+/−1 millimeters. A front end of the routing tube 154 can be accessed at a front opening 158 along the right side of the head tube 74 of the main frame 64. The routing tube 154 can pass through a front portion of the top tube 76, through the side tube 80, and into the seat tube 78 of the main frame 64. From there, an individual housing (e.g., electrical or mechanical) can travel further toward the intended destination. For example, a rear hydraulic brake housing can exit the main frame 64 and enter one or both of the chainstays 82 to travel toward a rear brake (not illustrated). Motor and battery control cables can exit the routing tube 154 and travel toward a motor and battery controller 159 mounted to the motor housing 142 under the motor cover 152. The motor and battery controller 159 can be part of and/or coupled to any of a variety of components, including the motor assembly 60, battery assembly 58, or user interface 93. In some embodiments, the motor and battery controller 159 can comprise a processor and memory configured to store computer instructions configured to run on the processor.

It is noted that passing the routing tube 154 through the top tube 76 and side tube 80 can avoid passing housings through the down tube 72, thereby allowing the battery assembly 58 to use up the volume inside the down tube 72, permitting more battery capacity of battery assembly 58. Further, eliminating housings in the down tube 72 can facilitate a reduction in size (e.g., width) of the down tube 72, which can result in a more aesthetically pleasing main frame 64. Further, eliminating housings from the down tube 72 can mitigate or eliminate potential damage to the housings upon insertion and removal of the battery assembly 58.

Figure 19:
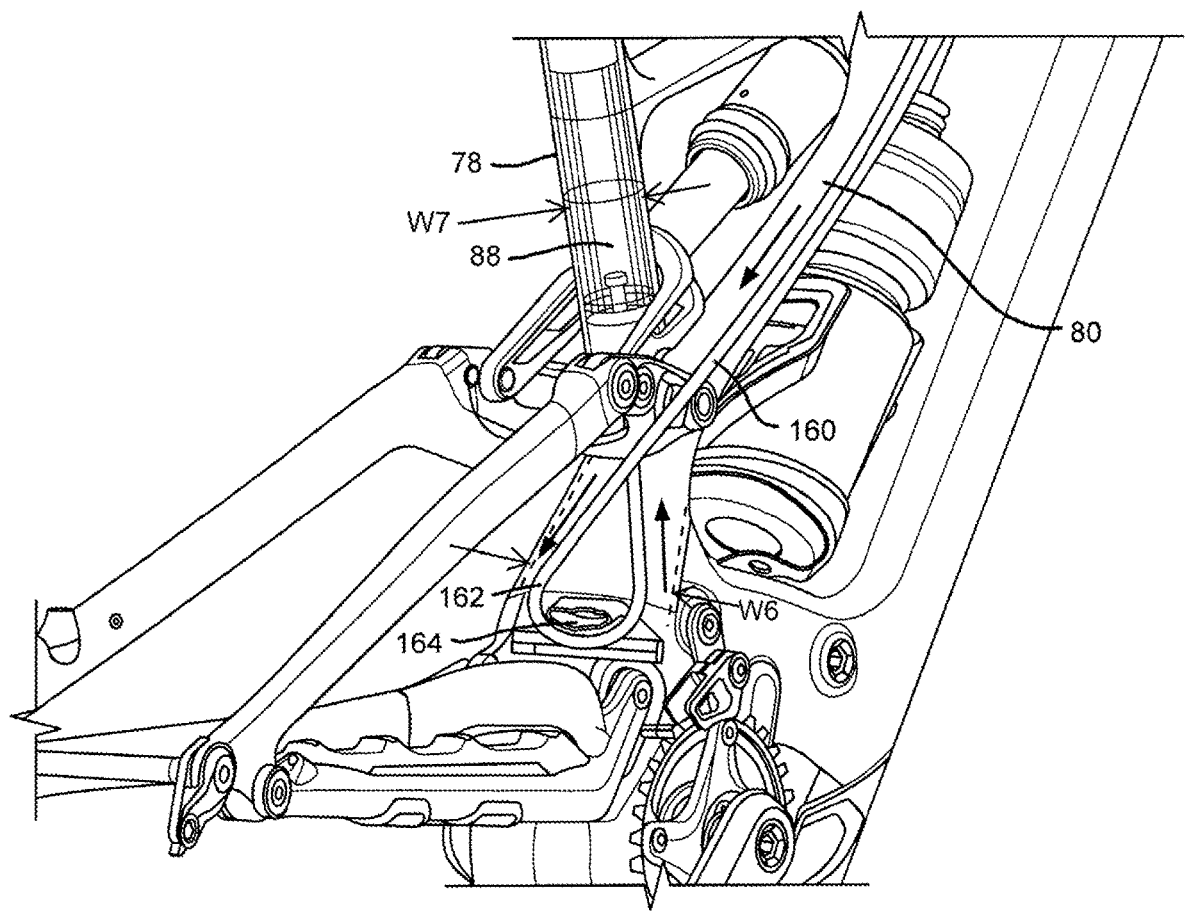
FIG. 19 is a rear perspective view of the frame assembly in FIG. 2 with a portion of the frame structure removed to show a cable housing loop leading to a dropper seat post.
Figure 20:
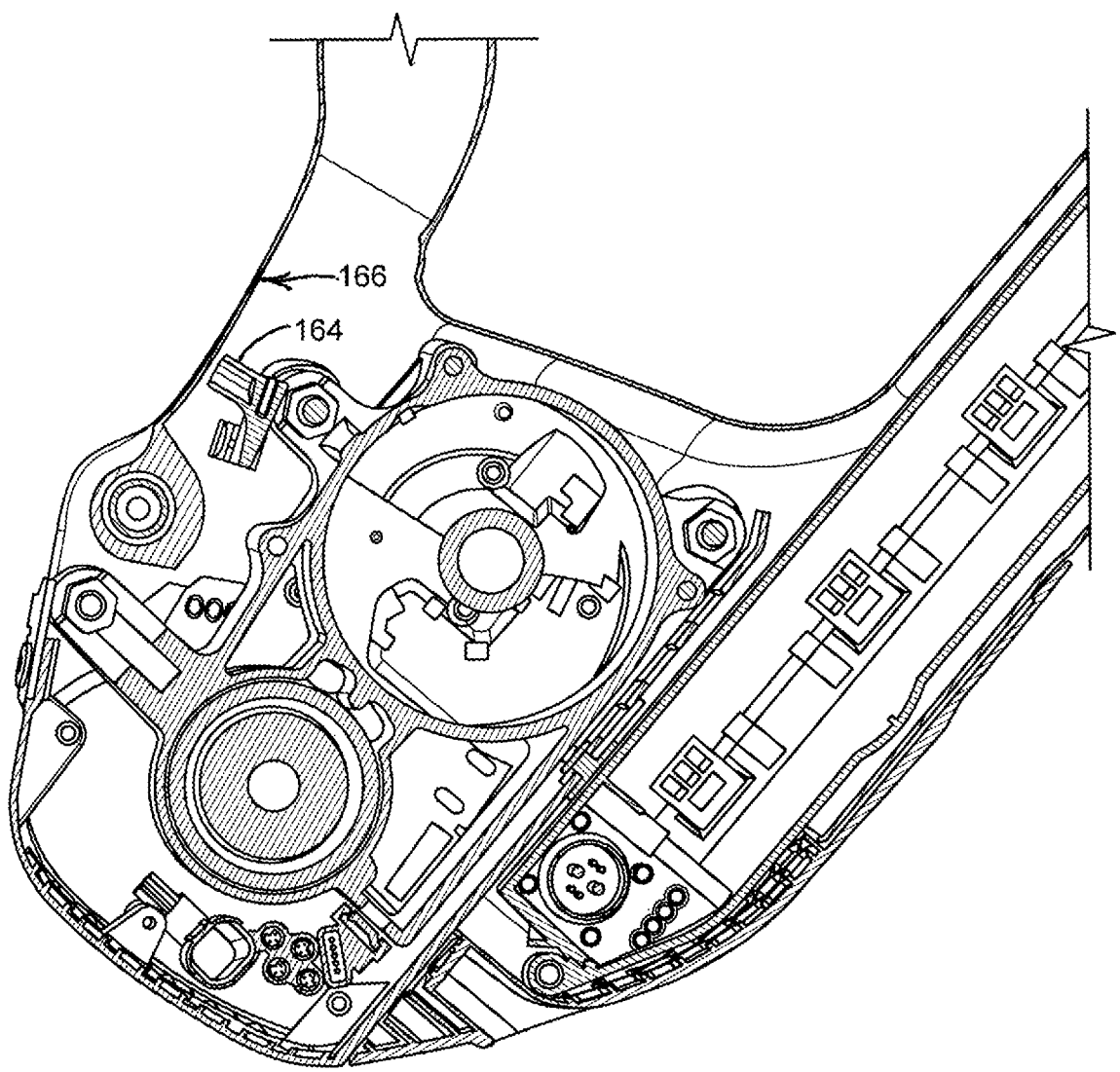
FIG. 20 is a section view of the frame assembly in FIG. 18 taken along line 20-20 in FIG. 18.
Figure 21:
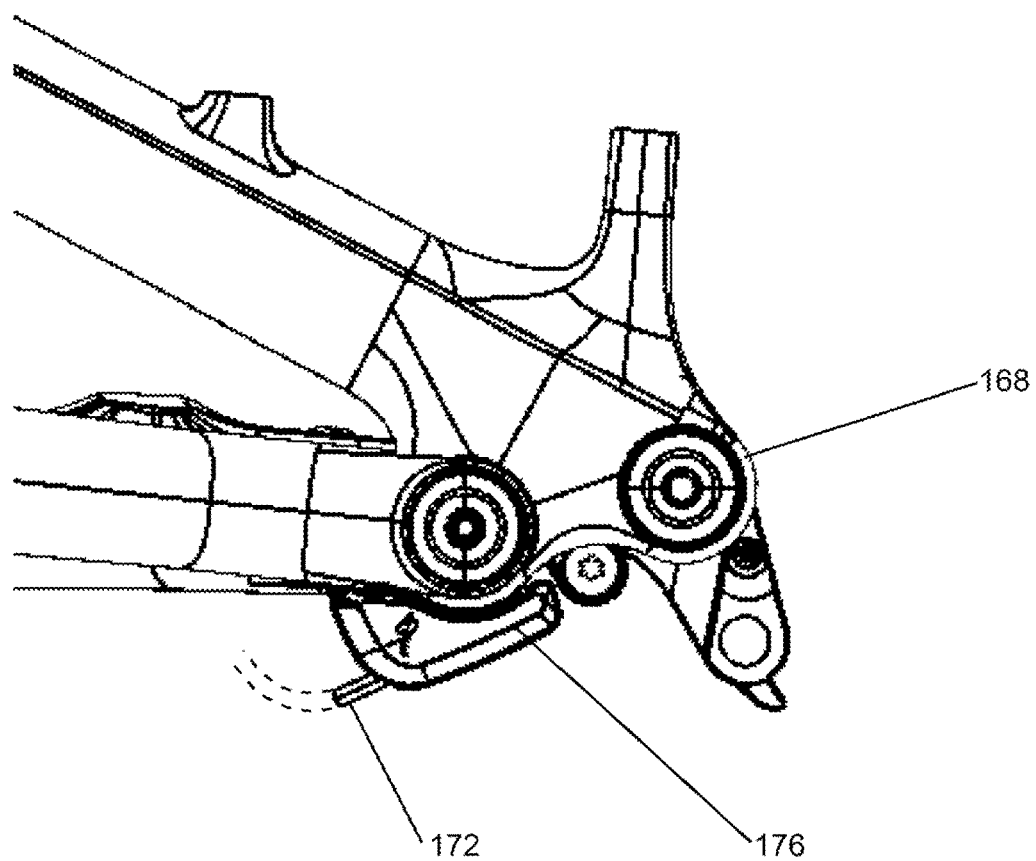
FIG. 21 is an enlarged side view of a left rear wheel support of the frame structure in FIG. 2 and showing a speed sensor assembly and sensor support.

One housing that can be inserted through the routing tube 154 can be a control housing 160 for the dropper seat post 88, which is shown in FIGS. 18-20. The dropper seat post 88 can receive the control housing 160 from its bottom end. As can be seen from the side view of the ebike 50 in FIG. 2, passing the control housing 160 from the side tube 80 to the upper portion of the seat tube 78 can result in a sharp turn of the control housing 160 of an upper acute angle α at the intersection of the side tube 80 and seat tube 78. In order to avoid this sharp turn of the control housing 160, the control housing 160 can be formed into a loop 162 inside the frame structure 62 below the intersection and below the dropper seat post 88 so that there is gradual redirection of the control housing 160 from the side tube 80 to the seat tube 78. The inner width W6 of the frame structure 62 at the location of the loop 162 (about 60 millimeters) can be larger than an inner width W7 of the upper portion of the seat tube 78 (about 31 millimeters) where the seat post 88 is located, and also can be larger than the width of the loop 162. This loop 162 can be maintained by a loop stay 164 that can be secured to the motor housing 142 by the rear upper fasteners 148. Further, the loop stay 164 can be positioned close to an inside surface 166 of the bottom shell 70 so that the control housing 160 cannot pass between. By virtue of the loop stay 164 being positioned below the dropper seat post 88, the control housing 160 can exit the side tube 80, wrap gradually around the loop stay 164, and then extend up toward the bottom end of the dropper seat post 88.

Referring to FIGS. 21-25, the ebike 50 can further include a speed sensor assembly configured to measure the speed of the ebike 50. The speed sensor assembly can be mounted on a left chainstay of the chainstays 82 immediately in front of a rear wheel support 168. Other mounting locations, such as, for example, the seatstay, fork, or dropout, are possible. The speed sensor assembly can include a sensor unit 170 and a sensor wire 172 coupling the sensor unit 170 to the motor and battery controller 159 (FIG. 17). The sensor unit 170 can comprise an inductive sensor configured to sense a presence of a magnet attached to the rear wheel 54. The magnet can be secured to the rear wheel 54 at a location spaced from a rotational axis of the rear wheel 54 so that, as the rear wheel 54 rotates, the magnet moves in a circular path. For example, the magnet can be attached to a wheel spoke or to a rear brake disk. The sensor unit 170 can be positioned in sufficiently close proximity to the circular path such that it can sense the magnet as the magnet passes by as the rear wheel 54 rotates. The processor can receive information from the sensor unit 170 relating to the rate at which the magnet, and thus the rear wheel 54, is rotating. Given a known wheel circumference, the processor can calculate the ebike speed using well known formulas.

Figure 22:
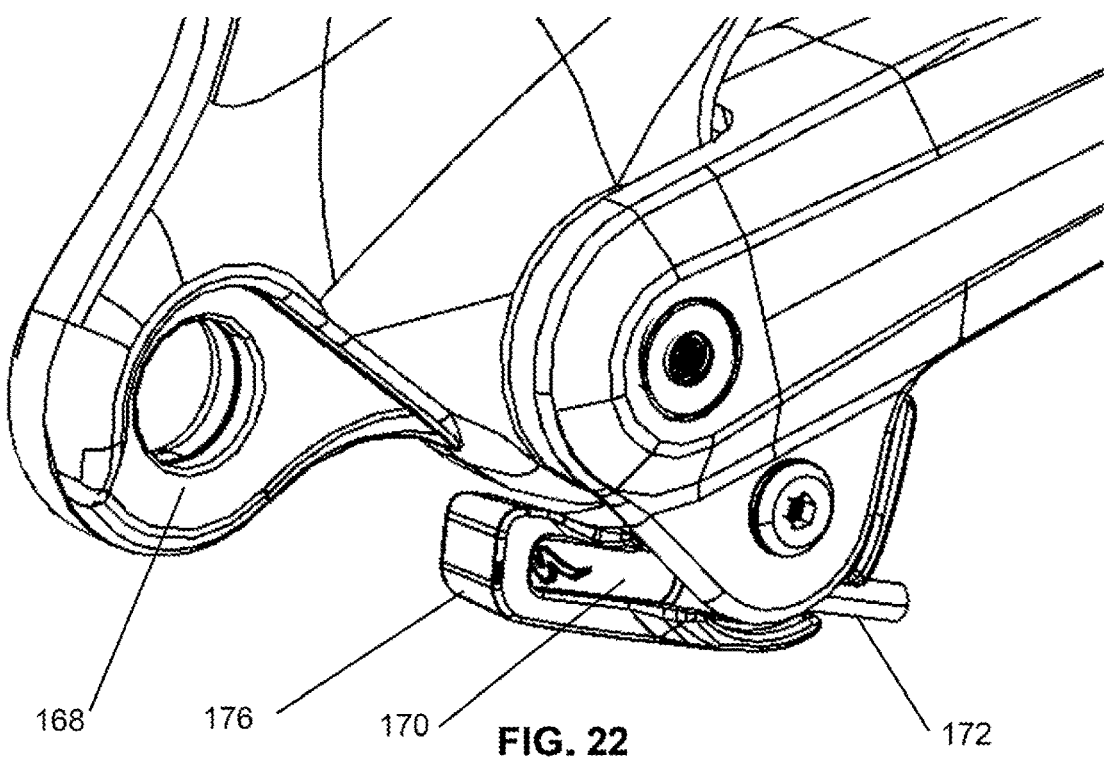
FIG. 22 is a right rear perspective view of the left rear wheel support, speed sensor assembly, and sensor support in FIG. 21.
Figure 23:
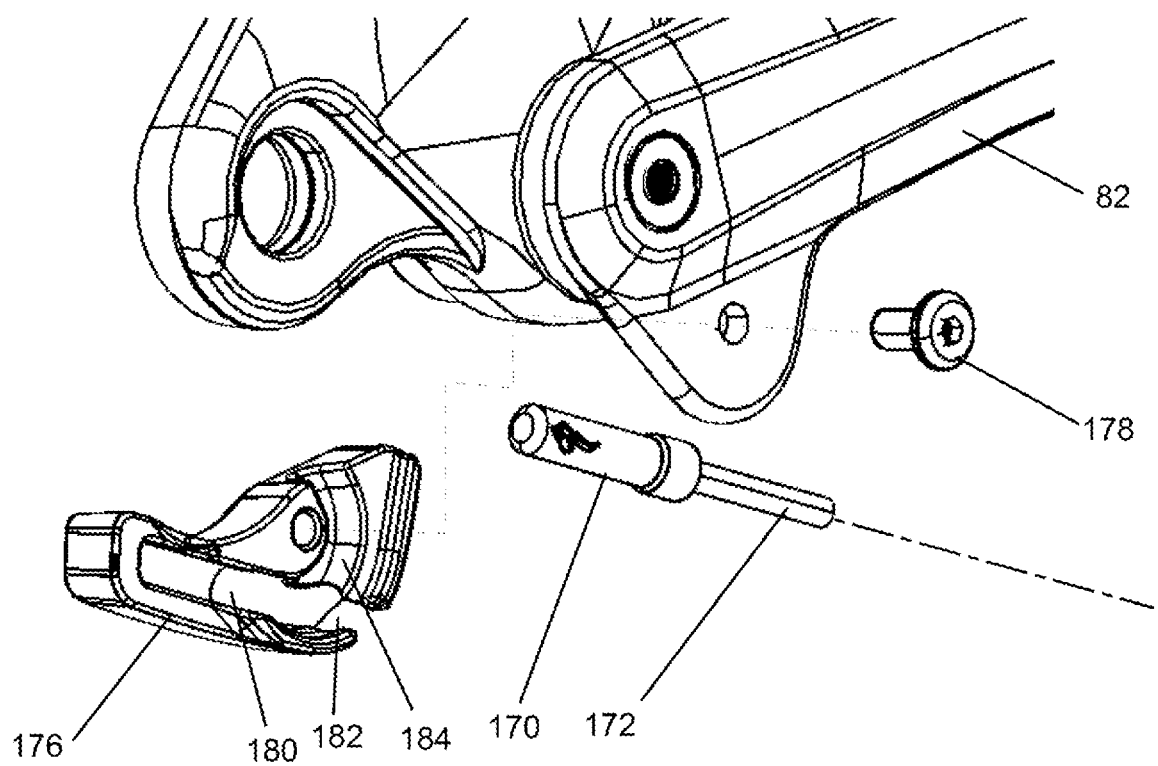
FIG. 23 is an exploded view of the speed sensor in FIG. 21.
Figure 24:
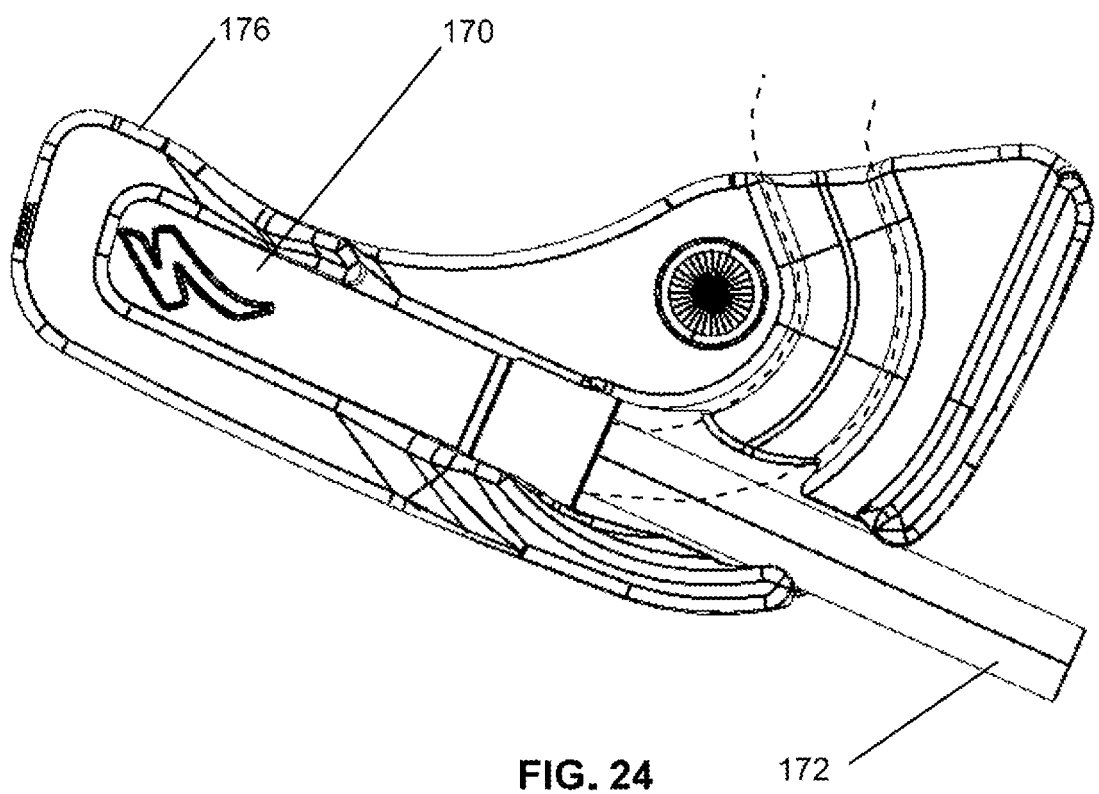
FIG. 24 is a right side view of the speed sensor assembly and sensor support in FIG. 21.

The sensor unit 170 can be coupled to the left chainstay of the chainstays 82 of the frame structure 62 using a sensor mount 176 that is attached to the left chainstay 82 by a mount fastener 178, as shown in FIG. 22-24. In the attached position, the sensor mount 176 can sandwich the sensor unit 170 between the sensor mount 176 and the chainstay 82. In order to further secure the sensor unit 170, the sensor mount 176 can include a first recess 180 shaped to receive the sensor unit 170 and a second recess 182 shaped to receive the sensor wire 172. In some embodiments, the first recess 180 and the second recesses 182 can be elongated, semi-cylindrically-shaped recesses that are aligned with each other so that the aligned orientation of the sensor unit 170 and sensor wire 172 is maintained.

The sensor mount 176 can further include a third recess 184 dimensioned to receive the sensor wire 172 in a different orientation than the second recess 182. The third recess 184 can be curved so that the sensor wire 172 can be guided upward into the chainstay 82. Such a configuration can facilitate routing the sensor wire 172 through the chainstay 82, if desired.

Figure 25:
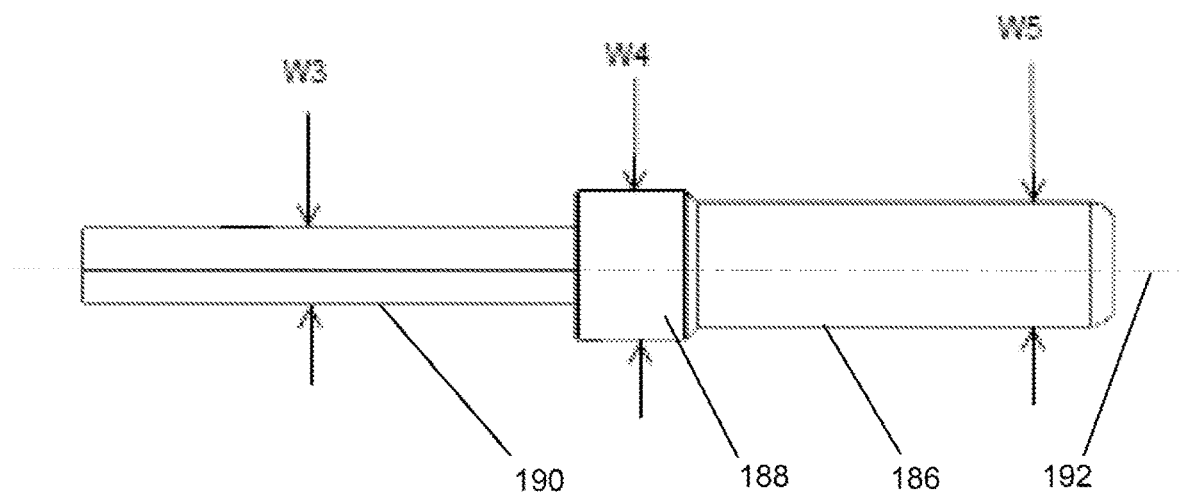
FIG. 25 is a side view of the speed sensor assembly in FIG. 21.

Referring to FIG. 25, the speed sensor can be designed to be low profile, which makes the speed sensor usable in a variety of applications, such as, for example, in different locations on different types of bicycles, and further enhances the ability to thread the speed sensor through small openings. The sensor unit 170 can include a cylindrically-shaped body 186 and a cylindrically-shaped collar 188 on one end of the cylindrically-shaped body 186. The sensor wire 172 includes an outer housing 190 that also can be cylindrically shaped and can be secured to the end of the collar 188 such that the sensor wire 172 and sensor unit 170 are coaxially aligned with each other, thus defining a sensor axis 192. It should be understood that the cylindrically-shaped body 186, cylindrically-shaped collar 188, and sensor wire 172 can be implemented with different shapes (e.g., elliptical, rectangular, square, etc.) than are shown in the drawings.

The low profile characteristic of the speed sensor assembly can be facilitated by making the sensor unit 170 only slightly larger than the sensor wire 172. That is, the sensor wire 172 can have a maximum width W3 (perpendicular to the sensor axis 192) of about 3 millimeters +/−5 percent (%), the sensor unit 170 can have a maximum width W4 at the collar 188 that is about 6 millimeters +/−5 percent (%), and the sensor unit 170 can have a minimum width W5 at the body that is about 5 millimeters +/−5 percent (%). Accordingly, it can be seen that the sensor unit 170 has a maximum width that is about two times the width of the sensor wire 172.

Although illustrated in connection with an ebike, it should be understood that many of the features described herein, including housings through the side tube, the loop stay, and the speed sensor, are applicable to standard bicycles in addition to ebikes.

Various features and advantages of the invention are set forth in the following claims.

The invention claimed is:

1. An ebike comprising:
 a front wheel;
 a rear wheel, a center plane of the rear wheel defining a vertical center plane;
 a frame structure supported on the front wheel and the rear wheel, the frame structure including a main frame and further including a rear frame pivotally coupled to the main frame at a lower pivot axis defining a horizontal plane, wherein the horizontal plane is perpendicular to the vertical center plane and parallel to a ground surface when the front wheel is resting on the ground surface and the rear wheel is resting on the ground surface, and extends through the lower pivot axis, wherein the main frame includes a head tube, a down tube, a seat tube, and a bottom shell coupling the down tube to the seat tube, the bottom shell including sidewalls at least partially defining a hollow interior;
 a motor assembly having an upper motor portion positioned in the hollow interior of the bottom shell and a lower motor portion hanging below the bottom shell, the motor assembly being secured to the bottom shell by a lower fastener below the horizontal plane and an upper fastener above the horizontal plane, wherein the lower fastener is positioned rearward of the lower pivot axis;
 a motor controller coupled to the frame structure; and a speed sensor assembly coupled to the frame structure for sensing rotational speed of at least one of the front wheel or the rear wheel, the speed sensor assembly including:
  a sensor unit coupled to the frame structure adjacent to the at least one of the front wheel or the rear wheel, the sensor unit having two ends, a length between the two ends, and a maximum sensor width measured perpendicular to the length; and
  a sensor wire secured to an end of the two ends of the sensor unit and coupling the sensor unit to the motor controller, wherein the sensor wire includes an outer housing having a housing width that is at least 25% of the maximum sensor width.

2. An ebike as claimed in claim 1, wherein the housing width is at least 30% of the maximum sensor width.

3. An ebike as claimed in claim 1, wherein the housing width is at least 40% of the maximum sensor width.

4. An ebike as claimed in claim 1, wherein the housing width is at least 50% of the maximum sensor width.

5. An ebike as claimed in claim 1, wherein the sensor unit is free of an integral mounting structure.

6. An ebike as claimed in claim 1, further comprising a sensor mount secured to the frame structure, wherein the sensor unit is sandwiched between the sensor mount and the frame structure.

7. An ebike as claimed in claim 6, wherein the sensor mount includes a first recess shaped to receive the sensor unit and a second recess shaped to receive the sensor wire.

8. An ebike as claimed in claim 7, wherein the second recess is shaped to receive the sensor wire in a first configuration, and wherein the sensor mount further includes a third recess adapted to receive the sensor wire in a second configuration different than the first configuration.

9. An ebike as claimed in claim 6, wherein the frame structure includes a chainstay, and wherein the sensor mount is secured to the chainstay.

10. An ebike as claimed in claim 1, wherein the upper fastener is a first upper fastener, wherein the frame structure includes a second upper fastener, wherein both the first upper fastener and the second upper fastener are positioned above the horizontal plane, wherein the lower pivot axis is positioned rearward of both the first upper fastener and the second upper fastener, wherein the lower pivot axis is positioned between the second upper fastener and the lower fastener, wherein the frame structure includes a chainstay and a seatstay that are pivotally coupled to one another at a rear pivot axis, and wherein both the lower pivot axis and the rear pivot axis are positioned rearward of the first upper fastener and the second upper fastener.

11. A bicycle frame assembly comprising:
  a frame structure including a main frame and further including a rear frame pivotally coupled to the main frame at a lower pivot axis defining a horizontal plane, wherein the horizontal plane is perpendicular to a vertical center plane and parallel to a ground surface when a front wheel is resting on the ground surface and a rear wheel is resting on the ground surface, and extends through the lower pivot axis, wherein the main frame includes a head tube, a down tube, a seat tube, and a bottom shell coupling the down tube to the seat tube, the bottom shell including sidewalls at least partially defining a hollow interior;
  a motor assembly having an upper motor portion positioned in the hollow interior of the bottom shell and a lower motor portion hanging below the bottom shell, the motor assembly being secured to the bottom shell by a lower fastener below the horizontal plane and an upper fastener above the horizontal plane, wherein the lower fastener is positioned rearward of the lower pivot axis;
  a motor controller coupled to the frame structure; and
  a speed sensor assembly coupled to the frame structure and configured to sense rotational speed of at least one of the front wheel or the rear wheel, the speed sensor assembly including:
    a sensor unit coupled to the frame structure and having two ends, a length between the two ends, and a maximum sensor width measured perpendicular to the length; and
    a sensor wire secured to an end of the two ends of the sensor unit and coupling the sensor unit to the motor controller, wherein the sensor wire includes an outer housing having a housing width that is at least 25% of the maximum sensor width.

12. A bicycle frame assembly as claimed in claim 11, wherein the housing width is at least 30% of the maximum sensor width.

13. A bicycle frame assembly as claimed in claim 11, wherein the housing width is at least 40% of the maximum sensor width.

14. A bicycle frame assembly as claimed in claim 11, wherein the housing width is at least 50% of the maximum sensor width.

15. A bicycle frame assembly as claimed in claim 11, wherein the sensor unit is free of an integral mounting structure.

16. A bicycle frame assembly as claimed in claim 11, further comprising a sensor mount secured to the frame structure, wherein the sensor unit is sandwiched between the sensor mount and the frame structure.

17. A bicycle frame assembly as claimed in claim 16, wherein the sensor mount includes a first recess shaped to receive the sensor unit and a second recess shaped to receive the sensor wire.

18. A bicycle frame assembly as claimed in claim 17, wherein the second recess is shaped to receive the sensor wire in a first configuration, and wherein the sensor mount further includes a third recess adapted to receive the sensor wire in a second configuration different than the first configuration.

19. A bicycle frame assembly as claimed in claim 16, wherein the frame structure includes a chainstay, and wherein the sensor mount is secured to the chainstay.

20. A bicycle frame assembly as claimed in claim 11, wherein the upper fastener is a first upper fastener, wherein the frame structure includes a second upper fastener, wherein both the first upper fastener and the second upper fastener are positioned above the horizontal plane, wherein the lower pivot axis is positioned rearward of both the first upper fastener and the second upper fastener, wherein the lower pivot axis is positioned between the second upper fastener and the lower fastener, wherein the frame structure includes a chainstay and a seatstay that are pivotally coupled to one another at a rear pivot axis, and wherein both the lower pivot axis and the rear pivot axis are positioned rearward of the first upper fastener and the second upper fastener.

* * * * *